(12) United States Patent
Sasaki et al.

(10) Patent No.: US 7,933,095 B2
(45) Date of Patent: Apr. 26, 2011

(54) MAGNETIC HEAD FOR PERPENDICULAR MAGNETIC RECORDING INCLUDING A STOPPER LAYER FOR SUPPRESSING PROTRUSION OF THE FRONT END FACE OF A SHIELD

(75) Inventors: Yoshitaka Sasaki, Milpitas, CA (US);
Hiroyuki Itoh, Milpitas, CA (US);
Hironori Araki, Milpitas, CA (US);
Takehiro Horinaka, Milpitas, CA (US);
Kowang Liu, Fremont, CA (US);
Erhard Schreck, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 790 days.

(21) Appl. No.: 11/987,786

(22) Filed: Dec. 4, 2007

(65) Prior Publication Data
US 2009/0141406 A1  Jun. 4, 2009

(51) Int. Cl.
*G11B 5/33* (2006.01)
*G11B 5/127* (2006.01)
(52) U.S. Cl. ............... 360/125.12; 360/319; 360/125.02
(58) Field of Classification Search ............ 360/125.02, 360/319, 320, 125.03, 125.08, 125.12, 123.12, 360/119.04
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 7,508,629 B2 | 3/2009 | Sasaki et al. | |
| 7,518,824 B2 * | 4/2009 | Sasaki et al. | 360/125.09 |
| 7,551,394 B2 * | 6/2009 | Sasaki et al. | 360/125.08 |
| 2008/0088972 A1 * | 4/2008 | Sasaki et al. | 360/110 |
| 2008/0180858 A1 * | 7/2008 | Ota et al. | 360/313 |
| 2008/0277376 A1 * | 11/2008 | Sasaki et al. | 216/22 |
| 2008/0316653 A1 * | 12/2008 | Sasaki et al. | 360/319 |
| 2009/0141406 A1 * | 6/2009 | Sasaki et al. | 360/319 |

FOREIGN PATENT DOCUMENTS

JP A-2007-157312 6/2007

OTHER PUBLICATIONS

Japanese Office Action in Japanese Patent Application No. 2008-185706, dated Jun. 2, 2010 (with English translation).

* cited by examiner

*Primary Examiner* — Brian E Miller
(74) *Attorney, Agent, or Firm* — Oliff & Berridge, PLC

(57) ABSTRACT

A magnetic head includes a pole layer and a shield. The shield includes a shield layer having a front end face located in the medium facing surface at a position forward of an end face of the pole layer along a direction of travel of the recording medium. The magnetic head further includes a stopper layer for suppressing protrusion of the front end face of the shield layer, the stopper layer being disposed adjacent to the shield layer and made of a nonmagnetic material having a linear thermal expansion coefficient of $5 \times 10^{-6}/°$ C. or smaller at a temperature of 25° C. to 100° C.

24 Claims, 24 Drawing Sheets

MAGNETIC HEAD FOR PERPENDICULAR MAGNETIC RECORDING INCLUDING A STOPPER LAYER FOR SUPPRESSING PROTRUSION OF THE FRONT END FACE OF A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and to a method of manufacturing such a magnetic head.

2. Description of the Related Art

The recording systems of magnetic read/write devices include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of implementing higher linear recording density, compared with the longitudinal magnetic recording system.

Typically, magnetic heads for perpendicular magnetic recording have a structure in which a reproducing (read) head having a magnetoresistive element (that may be hereinafter referred to as an MR element) for reading and a recording (write) head having an induction-type electromagnetic transducer for writing are stacked on a substrate, like magnetic heads for longitudinal magnetic recording. The write head includes a pole layer that produces a magnetic field in the direction perpendicular to the plane of the recording medium.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, if the track width is reduced, the write characteristics, such as an overwrite property that is a parameter indicating an overwriting capability, suffer degradation. Better write characteristics are therefore required as the track width becomes smaller.

As a magnetic head for perpendicular magnetic recording, there is known a magnetic head including a pole layer and a shield, as disclosed in U.S. Pat. No. 4,656,546, for example. In this magnetic head, an end face of the shield is located in a medium facing surface at a position forward of an end face of the pole layer along the direction of travel of the recording medium, with a predetermined small distance provided therebetween. Such a magnetic head will be hereinafter called a shield-type head. In shield-type heads, the shield has a function of preventing a magnetic flux from reaching the recording medium, the flux being generated from the end face of the pole layer and expanding in directions except the direction perpendicular to the plane of the recording medium. The shield also has a function of returning a magnetic flux that has been generated from the end face of the pole layer and has magnetized the recording medium. Shield-type heads allow a further improvement in linear recording density.

U.S. Pat. No. 4,672,493 discloses a magnetic head having a central magnetic layer that serves as the pole layer and other magnetic layers that are respectively disposed forward and backward of the central magnetic layer along the direction of travel of the recording medium, with coils provided between the central magnetic layer and the magnetic layer disposed forward and between the central magnetic layer and the magnetic layer disposed backward, respectively. This magnetic head is capable of increasing components of the magnetic field generated from the medium-facing-surface-side end of the central magnetic layer, the components lying in the direction perpendicular to the plane of the recording medium.

Reference is now made to FIG. 26 to describe a basic configuration of shield-type heads. FIG. 26 is a cross-sectional view of a main part of an example of shield-type heads. This shield-type head includes: a medium facing surface 100 that faces toward a recording medium; a coil 101 for generating a magnetic field corresponding to data to be written on the recording medium; a pole layer 102 having an end located in the medium facing surface 100, the pole layer 102 allowing a magnetic flux corresponding to the magnetic field generated by the coil 101 to pass and generating a write magnetic field for writing the data on the recording medium by means of the perpendicular magnetic recording system; a shield layer 103 having an end located in the medium facing surface 100, the shield layer 103 being coupled to a portion of the pole layer 102 away from the medium facing surface 100; a gap layer 104 provided between the pole layer 102 and the shield layer 103; and an insulating layer 105 covering the coil 101. An insulating layer 106 is disposed around the pole layer 102. The shield layer 103 is covered with a protection layer 107.

In the medium facing surface 100, the end of the shield layer 103 is located forward of the end of the pole layer 102 along the direction T of travel of the recording medium, with a predetermined distance therebetween provided by the thickness of the gap layer 104. At least part of the coil 101 is disposed between the pole layer 102 and the shield layer 103 and insulated from the pole layer 102 and the shield layer 103.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 26, the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 is opposed to the pole layer 102 with the gap layer 104 disposed in between. The length (height) of the portion where the pole layer 102 and the shield layer 103 are opposed to each other with the gap layer 104 disposed in between, as taken from the end closer to the medium facing surface 100 to the opposite end, is called throat height TH. The throat height TH has an influence on the intensity and distribution of the magnetic field generated from the pole layer 102 in the medium facing surface 100.

In a shield-type head such as the one illustrated in FIG. 26, it is desirable to reduce the throat height TH to improve the overwrite property. It is required that the throat height TH be 0.1 to 0.3 μm, for example. When such a small throat height TH is required, the head of FIG. 26 encounters a problem that, during operation of the head, the insulating layer 105 expands due to heat generated by the coil 101 and consequently an end portion of the shield layer 103 closer to the medium facing surface 100 protrudes.

A magnetic head for use in a magnetic disk drive such as a hard disk drive is typically provided in a slider. The slider has a medium facing surface that faces toward the recording medium. The medium facing surface has an air-inflow-side end and an air-outflow-side end. The slider is configured to slightly fly over the surface of the recording medium by means of an airflow that comes from the air-inflow-side end into the space between the medium facing surface and the recording medium. The magnetic head is typically disposed near the air-outflow-side end of the medium facing surface of the slider.

To improve the recording density and signal-to-noise ratio, a reduction in flying height of the slider is required. With the current state of the art, it is possible to make the flying height of the slider be as small as about 4 to 6 nm. However, such a small flying height of the slider increases the possibility of collision of the slider with the recording medium in the case where the end portion of the shield layer closer to the medium facing surface protrudes due to heat generated by the coil during operation of the head, as mentioned above. In such a case, it is therefore difficult to reduce the flying height of the slider and consequently it is difficult to improve the recording density and signal-to-noise ratio.

OBJECT AND SUMMARY OF THE INVENTION

It is an object of the present invention to provide a magnetic head for perpendicular magnetic recording configured so that an end face of the pole layer and an end face of the shield are adjacent to each other with a gap layer disposed in between in the medium facing surface, the magnetic head being capable of suppressing protrusion of the end face of the shield induced by the heat generated by the coil, and to provide a method of manufacturing such a magnetic head.

A magnetic head for perpendicular magnetic recording of the present invention includes: a medium facing surface that faces toward a recording medium; a coil for generating a magnetic field corresponding to data to be written on the recording medium; a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system; a shield made of a magnetic material; and a gap layer made of a nonmagnetic material.

The shield includes a shield layer having a front end face located in the medium facing surface at a position forward of the end face of the pole layer along a direction of travel of the recording medium. The gap layer is disposed between the pole layer and the shield layer. The end face of the pole layer located in the medium facing surface has a side adjacent to the gap layer, and this side defines the track width.

The magnetic head for perpendicular magnetic recording of the present invention further includes a stopper layer for suppressing protrusion of the front end face of the shield layer, the stopper layer being disposed adjacent to the shield layer and made of a nonmagnetic material having a linear thermal expansion coefficient of $5\times10^{-6}/°$ C. or smaller at a temperature of 25° C. to 100° C.

In the magnetic head for perpendicular magnetic recording of the present invention, the material of which the stopper layer is made may have a thermal conductivity of 40 W/m·K or higher at a temperature of 25° C. In this case, the material of which the stopper layer is made may be any of SiC, AlN, and W.

The stopper layer need not be exposed at the medium facing surface. The stopper layer may have a groove for placing the shield layer therein, and the shield layer may be placed in the groove.

In the magnetic head for perpendicular magnetic recording of the present invention, the shield layer may further have a rear end face opposite to the front end face, and the stopper layer may be adjacent to the rear end face of the shield layer.

In the magnetic head for perpendicular magnetic recording of the present invention, the shield layer may have a center portion including the front end face, and two side portions that are located at positions outside the center portion along the track width direction and that are not exposed at the medium facing surface, and the stopper layer may include two portions located between the medium facing surface and the two side portions.

In the magnetic head for perpendicular magnetic recording of the present invention, the shield layer may have a bottom surface adjacent to the gap layer and a top surface opposite to the bottom surface, and the stopper layer may be adjacent to the top surface of the shield layer.

In the magnetic head for perpendicular magnetic recording of the present invention, the shield layer may have a bottom surface adjacent to the gap layer and a top surface opposite to the bottom surface, the shield may further include a second shield layer touching the top surface of the shield layer, and the second shield layer may have a first end face located in the medium facing surface and a second end face opposite to the first end face. In this case, the magnetic head for perpendicular magnetic recording may further include a second stopper layer for suppressing protrusion of the first end face of the second shield layer, the second stopper layer being disposed adjacent to the second end face of the second shield layer and made of a nonmagnetic material having a linear thermal expansion coefficient of $5\times10^{-6}/°$ C. or smaller at a temperature of 25° C. to 100° C. In this case, the second stopper layer may be adjacent to the top surface of the shield layer.

In the magnetic head for perpendicular magnetic recording of the present invention, the pole layer may have a top surface adjacent to the gap layer, and the magnetic head may further include a yoke layer that touches a portion of the top surface of the pole layer away from the medium facing surface. In this case, the stopper layer may have a first groove for placing the shield layer therein and a second groove for placing the yoke layer therein, and the shield layer may be placed in the first groove while the yoke layer may be placed in the second groove.

A method of manufacturing the magnetic head for perpendicular magnetic recording of the present invention includes the steps of: forming the pole layer; forming the gap layer on the pole layer; forming the stopper layer; forming the shield such that the shield layer is adjacent to the stopper layer; and forming the coil.

In the method of manufacturing the magnetic head for perpendicular magnetic recording of the present invention, the material of which the stopper layer is made may have a thermal conductivity of 40 W/m·K or higher at a temperature of 25° C. In this case, the material of which the stopper layer is made may be any of SiC, AlN, and W.

In the method of manufacturing the magnetic head for perpendicular magnetic recording of the present invention, the stopper layer need not be exposed at the medium facing surface.

In the method of manufacturing the magnetic head for perpendicular magnetic recording of the present invention, the stopper layer may have a groove for placing the shield layer therein, and the shield layer may be formed to be placed in the groove. In this case, the method of manufacturing the magnetic head may further include the step of forming an etching stopper film on the gap layer after the gap layer is formed. In addition, the step of forming the stopper layer may include the steps of: forming a nonmagnetic film on the etching stopper film, the nonmagnetic film being intended to undergo partial etching later to thereby become the stopper layer; and partially etching the nonmagnetic film until the etching stopper film is exposed so that an etched portion of the nonmagnetic film becomes the groove while the remainder of the nonmagnetic film becomes the stopper layer. The step of forming the shield may include the steps of: forming a magnetic film such that the groove is filled with the magnetic film and a top surface of the magnetic film is located higher than a top surface of the stopper layer, the magnetic film being intended to undergo polishing later to thereby become the shield layer; and polishing the magnetic film so that the top surface of the stopper layer and the top surface of the magnetic film are flattened and the magnetic film thereby becomes the shield layer.

In the method of manufacturing the magnetic head for perpendicular magnetic recording of the present invention, the shield layer may further have a rear end face opposite to the front end face, and the stopper layer may be adjacent to the rear end face of the shield layer.

In the method of manufacturing the magnetic head for perpendicular magnetic recording of the present invention, the shield layer may have a center portion including the front end face, and two side portions that are located at positions outside the center portion along the track width direction and that are not exposed at the medium facing surface, and the stopper layer may include two portions located between the medium facing surface and the two side portions.

In the method of manufacturing the magnetic head for perpendicular magnetic recording of the present invention, the shield layer may have a bottom surface adjacent to the gap layer and a top surface opposite to the bottom surface, and the stopper layer may be formed after forming the shield layer, such that the stopper layer is adjacent to the top surface of the shield layer.

In the method of manufacturing the magnetic head for perpendicular magnetic recording of the present invention, the shield layer may have a bottom surface adjacent to the gap layer and a top surface opposite to the bottom surface, the shield may further include a second shield layer touching the top surface of the shield layer, and the second shield layer may have a first end face located in the medium facing surface and a second end face opposite to the first end face. In this case, the magnetic head for perpendicular magnetic recording may further include a second stopper layer for suppressing protrusion of the first end face of the second shield layer, the second stopper layer being disposed adjacent to the second end face of the second shield layer and made of a nonmagnetic material having a linear thermal expansion coefficient of $5 \times 10^{-6}$/° C. or smaller at a temperature of 25° C. to 100° C. The method of manufacturing the magnetic head for perpendicular magnetic recording may further include the step of forming the second stopper layer and the second shield layer after the stopper layer and the shield layer are formed. In this case, the second stopper layer may be adjacent to the top surface of the shield layer.

In the method of manufacturing the magnetic head for perpendicular magnetic recording of the present invention, the pole layer may have a top surface adjacent to the gap layer, and the magnetic head for perpendicular magnetic recording may further include a yoke layer that touches a portion of the top surface of the pole layer away from the medium facing surface. In this case, the stopper layer may have a first groove for placing the shield layer therein and a second groove for placing the yoke layer therein. The method of manufacturing the magnetic head for perpendicular magnetic recording may further include the step of forming the yoke layer, and the shield layer may be formed to be placed in the first groove while the yoke layer may be formed to be placed in the second groove.

According to the magnetic head for perpendicular magnetic recording or the method of manufacturing the same of the present invention, the stopper layer made of a nonmagnetic material having a small linear thermal expansion coefficient is provided to be adjacent to the shield layer. This makes it possible to suppress protrusion of the end face of the shield or the front end face of the shield layer induced by the heat generated by the coil.

Other objects, features and advantages of the present invention will become fully apparent from the following description.

DETAILED DESCRIPTION OF THE PREFERRED EMBODIMENTS

First Embodiment

Figure 1:
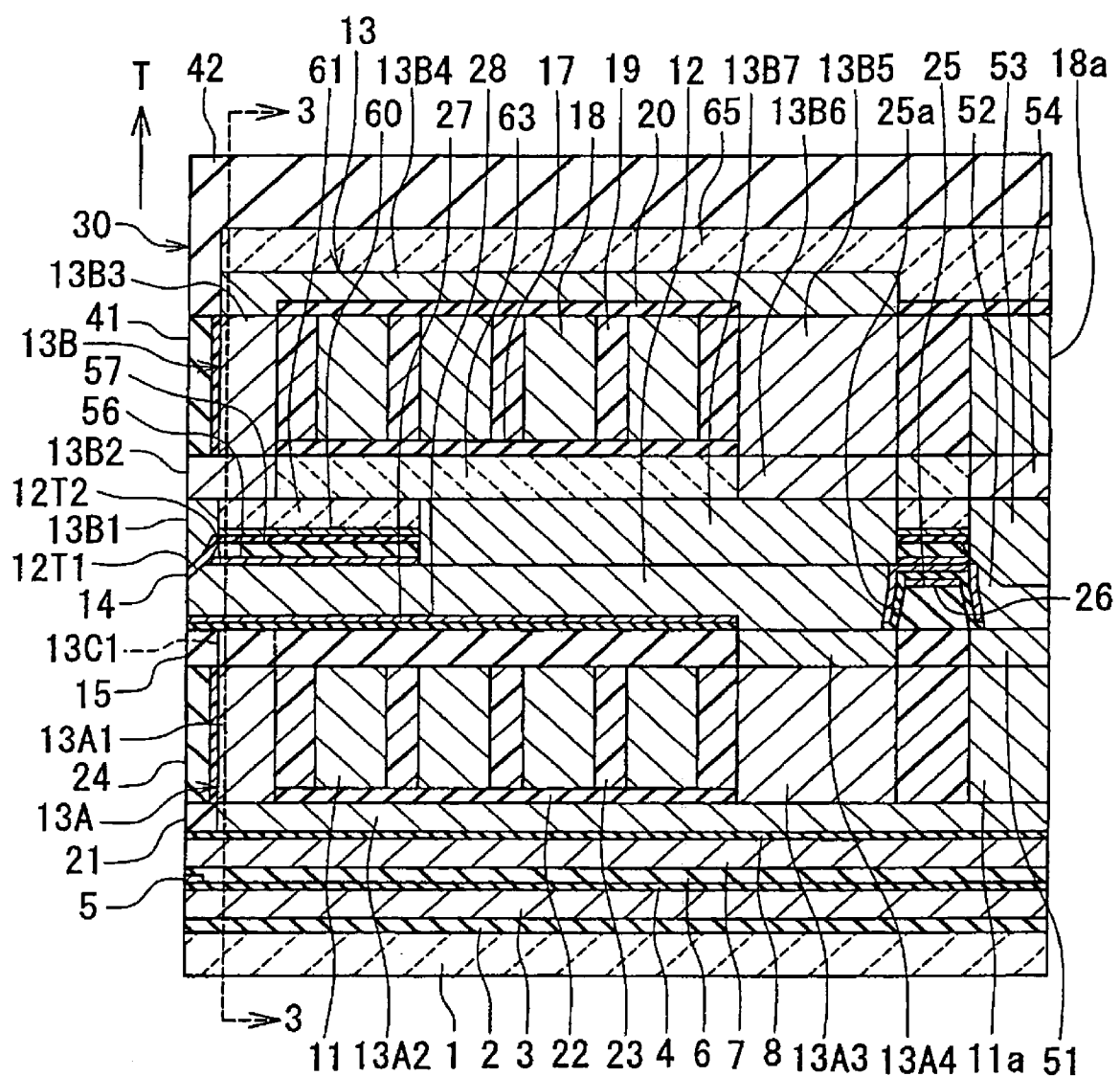
FIG. 1 is a cross-sectional view illustrating the configuration of a magnetic head of a first embodiment of the invention.
Figure 2:
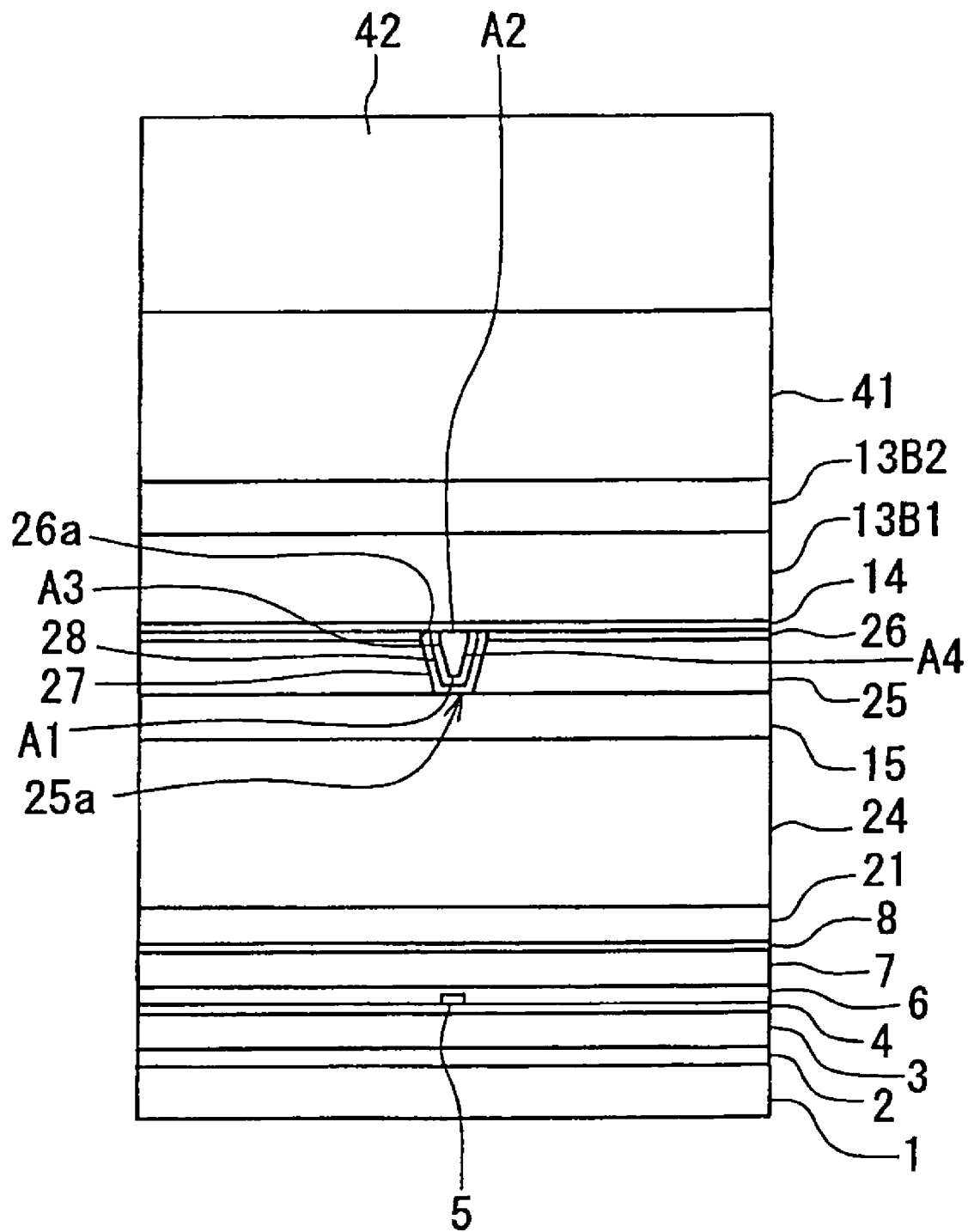
FIG. 2 is a front view of the medium facing surface of the magnetic head of the first embodiment of the invention.
Figure 3:
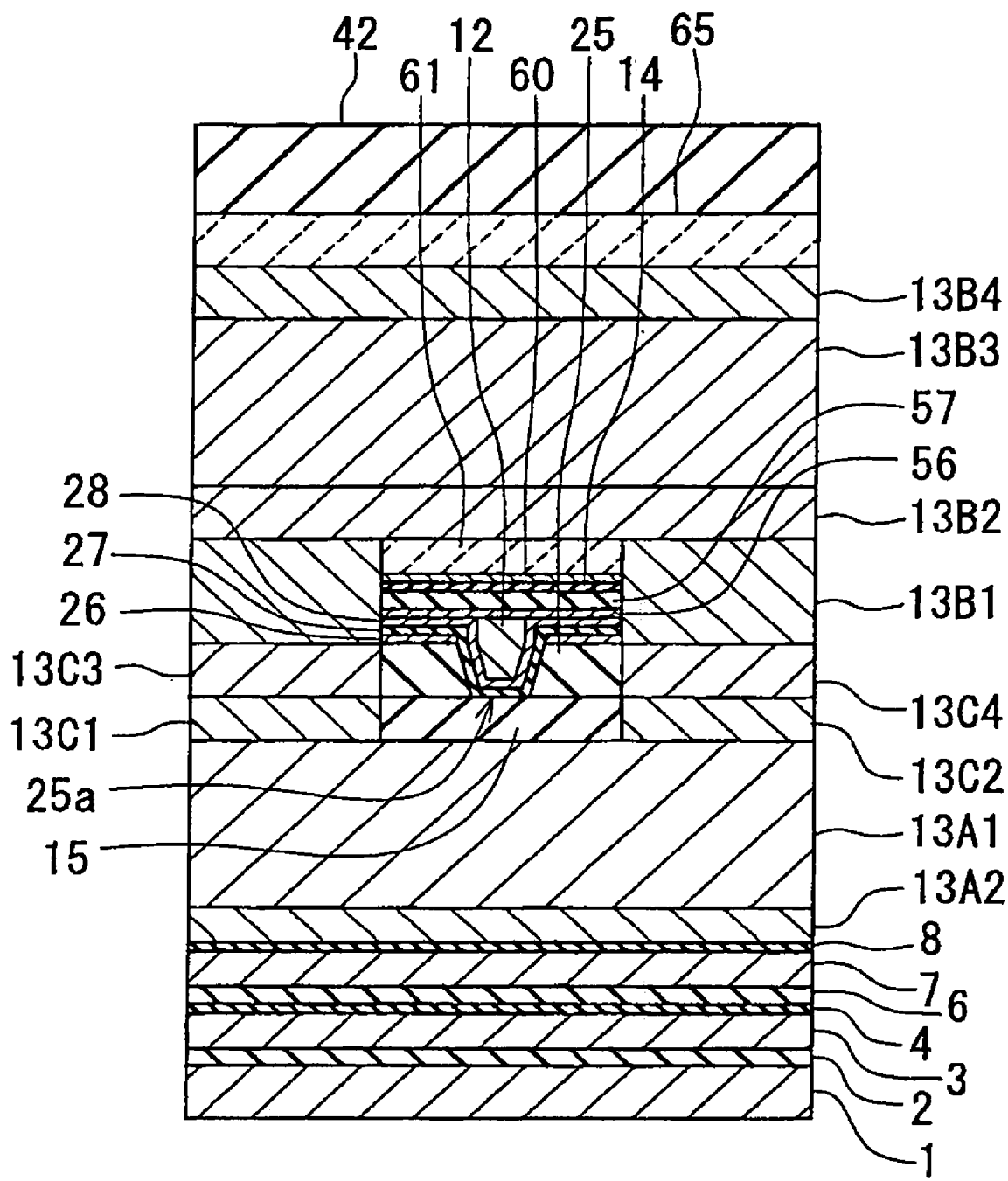
FIG. 3 is a cross-sectional view taken along line 3-3 of FIG. 1.
Figure 4:
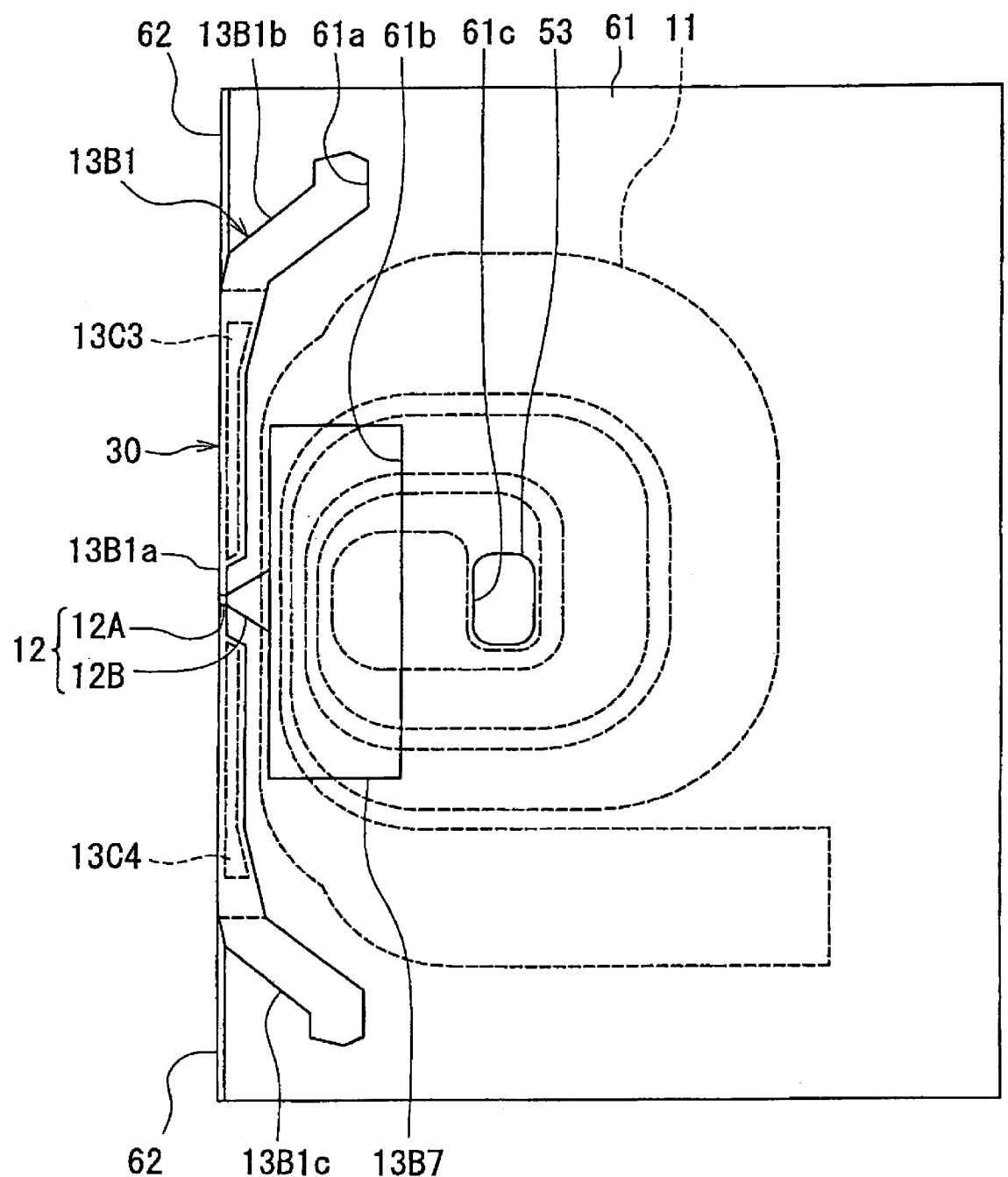
FIG. 4 is a top view illustrating a first stopper layer and elements in the neighborhood thereof in the magnetic head of the first embodiment of the invention.
Figure 5:
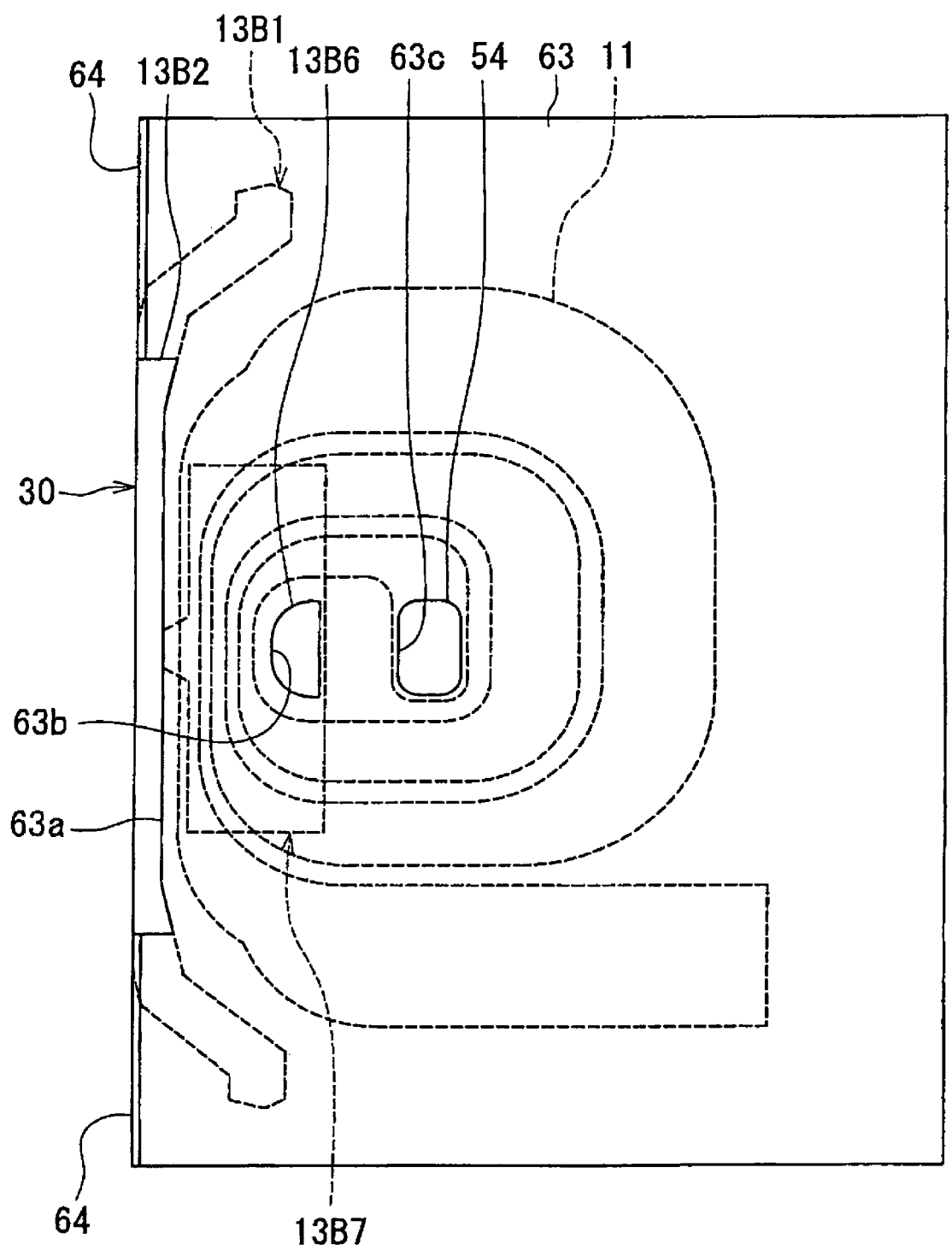
FIG. 5 is a top view illustrating a second stopper layer and elements in the neighborhood thereof in the magnetic head of the first embodiment of the invention.

Embodiments of the present invention will now be described in detail with reference to the drawings. Reference is first made to FIG. 1 to FIG. 5 to describe the configuration of a magnetic head for perpendicular magnetic recording of a first embodiment of the invention. FIG. 1 is a cross-sectional view illustrating the configuration of the magnetic head for perpendicular magnetic recording of the first embodiment. FIG. 1 illustrates a cross section perpendicular to the medium facing surface and the top surface of the substrate. In FIG. 1 the arrow marked with T shows the direction of travel of a recording medium. FIG. 2 is a front view of the medium facing surface of the magnetic head for perpendicular magnetic recording of the embodiment. FIG. 3 is a cross-sectional view taken along line 3-3 of FIG. 1. FIG. 4 is a top view illustrating a first stopper layer and elements in the neighborhood thereof in the magnetic head for perpendicular magnetic recording of the embodiment. FIG. 5 is a top view illustrating a second stopper layer and elements in the neighborhood thereof in the magnetic head for perpendicular magnetic recording of the embodiment.

As illustrated in FIG. 1 to FIG. 3, the magnetic head for perpendicular magnetic recording (hereinafter simply referred to as magnetic head) of this embodiment includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6.

An end of the MR element 5 is located in a medium facing surface 30 that faces toward the recording medium. The MR element 5 may be an element made of a magneto-sensitive film that exhibits a magnetoresistive effect, such as an AMR (anisotropic magnetoresistive) element, a GMR (giant magnetoresistive) element, or a TMR (tunneling magnetoresistive) element. The GMR element may be of a CIP (current-in-plane) type wherein a current used for detecting magnetic signals is fed in a direction nearly parallel to the planes of layers constituting the GMR element, or may be of a CPP (current-perpendicular-to-plane) type wherein a current used for detecting magnetic signals is fed in a direction nearly perpendicular to the planes of the layers constituting the GMR element.

The portion from the bottom shield layer 3 to the top shield layer 7 makes up a read head. The magnetic head further includes a nonmagnetic layer 8 made of a nonmagnetic material and disposed on the top shield layer 7, and a write head disposed on the nonmagnetic layer 8. The nonmagnetic layer 8 is made of alumina, for example. The write head includes a first coil 11, a second coil 18, a pole layer 12, a shield 13, and a gap layer 14.

Each of the first coil 11 and the second coil 18 is planar spiral-shaped. In addition, the first coil 11 and the second coil 18 are connected in series or in parallel. In FIG. 1, reference sign 11a indicates a connecting portion of the first coil 11 connected to the second coil 18, while reference sign 18a indicates a connecting portion of the second coil 18 connected to the first coil 11. The magnetic head further includes connecting layers 51, 52, 53 and 54 stacked in this order on the connecting portion 11a. The connecting portion 18a is located on the connecting layer 54.

The first coil 11 and the second coil 18 generate magnetic fields corresponding to data to be written on a recording medium. The pole layer 12 has an end face located in the medium facing surface 30, allows magnetic fluxes corresponding to the magnetic fields generated by the coils 11 and 18 to pass therethrough, and generates a write magnetic field for writing the data on the recording medium by means of the perpendicular magnetic recording system.

The shield 13 includes: a first portion 13A disposed backward of the pole layer 12 along the direction T of travel of the recording medium; a second portion 13B disposed forward of the pole layer 12 along the direction T of travel of the recording medium; and coupling portions 13C1, 13C2, 13C3 and 13C4. The first portion 13A, the second portion 13B, and the coupling portions 13C1, 13C2, 13C3 and 13C4 are each made of a magnetic material. The material of these can be any of CoFeN, CoNiFe, NiFe and CoFe, for example.

The first portion 13A includes a first layer 13A1, a second layer 13A2, a third layer 13A3, and a fourth layer 13A4 that are magnetically coupled. The second layer 13A2 is disposed on the nonmagnetic layer 8. The second layer 13A2 has an end face closer to the medium facing surface 30, and this end face is located at a distance from the medium facing surface 30. The magnetic head further includes an insulating layer 21 made of an insulating material and disposed around the second layer 13A2 on the nonmagnetic layer 8, and an insulating layer 22 made of an insulating material and disposed on a portion of the top surface the second layer 13A2. The insulating layers 21 and 22 are made of alumina, for example. The first coil 11 is disposed on the insulating layer 22.

The first layer 13A1 and the third layer 13A3 are disposed on the second layer 13A2. The first layer 13Al is disposed between the medium facing surface 30 and the coil 11. The third layer 13A3 is disposed farther from the medium facing surface 30 than is the first layer 13A1. The coil 11 is wound around the third layer 13A3. The fourth layer 13A4 is disposed on the third layer 13A3.

The magnetic head further includes an insulating layer 23 made of an insulating material and disposed around the coil 11 and in the space between the respective adjacent turns of the coil 11, and an insulating layer 24 disposed around the insulating layer 23, the first layer 13A1 and the third layer 13A3. Part of the insulating layer 23 covers an end face of the first layer 13A1 closer to the medium facing surface 30. The first layer 13A1, the third layer 13A3, the coil 11 and the insulating layers 23 and 24 have flattened top surfaces. The insulating layer 23 is made of photoresist, for example. The insulating layer 24 is made of alumina, for example. The coil 11 is made of a conductive material such as copper.

The magnetic head further includes an insulating layer 15 disposed around the fourth layer 13A4 and the connecting layer 51 on the top surfaces of the first layer 13A1, the coil 11 and the insulating layers 23 and 24, and an encasing layer 25 made of a nonmagnetic material and disposed on the insulating layer 15. The insulating layer 15 is made of alumina, for example. The encasing layer 25 has a groove 25a that opens at the top surface of the encasing layer 25 and that accommodates at least part of the pole layer 12. The groove 25a penetrates the encasing layer 25, and the level at which the bottom of the groove 25a is located coincides with the level at which the top surfaces of the insulating layer 15 and the fourth layer 13A4 are located. The encasing layer 25 further has an opening for exposing the top surface of the connecting layer 51. The encasing layer 25 can be made of, for example, an insulating material such as alumina, silicon oxide ($SiO_x$) or silicon oxynitride (SiON), or a nonmagnetic metal material such as Ru, Ta, Mo, Ti, W, NiCu, NiB or NiP.

The magnetic head further includes a nonmagnetic metal layer 26 made of a nonmagnetic metal material and disposed on the top surface of the encasing layer 25. The nonmagnetic metal layer 26 has a penetrating opening 26a, and the edge of the opening 26a is located directly above the edge of the groove 25a at the top surface of the encasing layer 25. The nonmagnetic metal layer 26 can be made of any of Ta, Mo, W, Ti, Ru, Rh, Re, Pt, Pd, Ir, NiCr, NiP, NiB, AlCu, $WSi_2$, $TaSi_2$, $TiSi_2$, TiN, and TiW, for example.

The magnetic head further includes a nonmagnetic film 27 and a polishing stopper layer 28 that are disposed in the groove 25a of the encasing layer 25 and in the opening 26a of the nonmagnetic metal layer 26. The nonmagnetic film 27 is disposed to touch the surface of the groove 25a. The pole layer 12 is disposed apart from the surface of the groove 25a. The polishing stopper layer 28 is disposed between the nonmagnetic film 27 and the pole layer 12. The polishing stopper layer 28 also functions as an electrode layer (seed layer) used for forming the pole layer 12 by plating. The nonmagnetic film 27 and the polishing stopper layer 28 have openings for exposing the top surface of the fourth layer 13A4, and openings for exposing the top surface of the connecting layer 51. The pole layer 12 has a bottom surface, and a top surface opposite thereto. The bottom surface of the pole layer 12 touches the top surface of the fourth layer 13A4. The connecting layer 52 is disposed on the connecting layer 51.

The nonmagnetic film 27 is made of a nonmagnetic material. The material used to form the nonmagnetic film 27 can be an insulating material, a semiconductor material or a conductive material. The insulating material as the material to form the nonmagnetic film 27 can be any of alumina, silicon oxide ($SiO_x$), and silicon oxynitride (SiON), for example. The semiconductor material as the material to form the nonmagnetic film 27 can be polycrystalline silicon or amorphous silicon, for example. The conductive material as the material to form the nonmagnetic film 27 can be the same as the material used to form the nonmagnetic metal layer 26, for example.

The polishing stopper layer 28 is made of a nonmagnetic material. The material used to form the polishing stopper layer 28 may be a nonmagnetic conductive material or an insulating material. The nonmagnetic conductive material as the material to form the polishing stopper layer 28 can be the same as the material used to form the nonmagnetic metal layer 26, for example. The insulating material as the material to form the polishing stopper layer 28 can be silicon oxide, for example.

The pole layer 12 is made of a magnetic metal material. The pole layer 12 can be made of any of NiFe, CoNiFe and CoFe, for example.

As illustrated in FIG. 3, the coupling portions 13C1 and 13C2 are disposed on the first layer 13A1. The coupling portion 13C3 is disposed on the coupling portion 13C1, and the coupling portion 13C4 is disposed on the coupling portion 13C2. The coupling portions 13C1, 13C3 and the coupling portions 13C2, 13C4 are disposed on both sides of the pole layer 12 that are opposite to each other along the track width direction.

The top surface of the pole layer 12 includes: a first portion 12T1 having a first edge located in the medium facing surface 30 and a second edge opposite to the first edge; and a second portion 12T2 located farther from the medium facing surface 30 than is the first portion 12T1 and connected to the first portion 12T1 at the second edge. As illustrated in FIG. 1, the distance from the substrate 1 to any point on the first portion 12T1 increases with increasing distance from the medium facing surface 30 to the point. The second portion 12T2 extends in a direction substantially perpendicular to the medium facing surface 30.

The magnetic head further includes nonmagnetic layers 56 and 57 that are made of a nonmagnetic material and are stacked in this order on a portion of the second portion 12T2. The nonmagnetic layer 56 is made of a metal material, for example. The metal material can be Ru, NiCr or NiCu, for example. The nonmagnetic layer 57 is made of an inorganic insulating material, for example. The inorganic insulating material can be alumina or silicon oxide, for example.

The gap layer 14 is disposed to cover the first portion 12T1 of the top surface of the pole layer 12 and the nonmagnetic layers 56 and 57. The gap layer 14 is made of a nonmagnetic material. The material used to form the gap layer 14 may be an insulating material such as alumina, or a nonmagnetic conductive material such as Ru, NiCu, Ta, W, NiB or NiP.

The nonmagnetic layers 56 and 57 and the gap layer 14 have openings for exposing a portion of the top surface of the pole layer 12 away from the medium facing surface 30, and openings for exposing the top surface of the connecting layer 52.

The second portion 13B of the shield 13 includes: a first layer 13B1, a second layer 13B2, a third layer 13B3, a fourth layer 13B4, a fifth layer 13B5, a sixth layer 13B6, and a top yoke layer 13B7 that are magnetically coupled. The first layer 13B1 is disposed on the gap layer 14. The first layer 13B1 has a front end face located in the medium facing surface 30 at a position forward of the end face of the pole layer along the direction T of travel of the recording medium. The first layer 13B1 corresponds to the shield layer of the present invention. In the medium facing surface 30, the front end face of the first layer 13B1 is located at a predetermined distance from the end face of the pole layer 12, the distance being provided by the thickness of the gap layer 14. The thickness of the gap layer 14 is preferably within a range of 5 to 60 nm, such as 30 to 60 nm, for example. The end face of the pole layer 12 has a side adjacent to the gap layer 14, and this side defines the track width.

The top yoke layer 13B7 touches the portion of the top surface of the pole layer 12 away from the medium facing surface 30 through the openings of the nonmagnetic layers 56 and 57 and the gap layer 14. The connecting layer 53 is disposed on the connecting layer 52.

The magnetic head further includes a nonmagnetic layer 60 and a first stopper layer 61 that are stacked in this order on the gap layer 14 around the first layer 13B1, the top yoke layer 13B7 and the connecting layer 53. The nonmagnetic layer 60 is made of a metal material, for example. The metal material can be NiCr, for example.

The first stopper layer 61 is a layer for suppressing protrusion of the front end face of the first layer 13B1. The first stopper layer 61 is made of a nonmagnetic material having a linear thermal expansion coefficient of $5\times10^{-6}/°$ C. or smaller at a temperature of 25° C. to 100° C., and is disposed adjacent to the first layer 13B1. The nonmagnetic material used to form the first stopper layer 61 is preferably an inorganic material or a metal material.

As illustrated in FIG. 4, the first stopper layer 61 has a groove 61a that accommodates the first layer 13B1, a groove 61b that accommodates the top yoke layer 13B7, and a groove 61c that accommodates the connecting layer 53. The nonmagnetic layer 60 has openings contiguous to the grooves 61a, 61b and 61c. The first layer 13B1, the top yoke layer 13B7 and the connecting layer 53 are placed in these grooves and openings. The first layer 13B1, the top yoke layer 13B7, the connecting layer 53 and the first stopper layer 61 have flattened top surfaces.

As illustrated in FIG. 4, the first stopper layer 61 has an end face closer to the medium facing surface 30, and this end face is located at a distance from the medium facing surface 30. The magnetic head further includes an insulating layer 62 disposed between the end face of the first stopper layer 61 and the medium facing surface 30. The insulating layer 62 is made of alumina, for example.

As illustrated in FIG. 3, the top surfaces of the coupling portions 13C3 and 13C4 touch the bottom surface of the first layer 13B1 at positions on both sides of the pole layer 12 that are opposite to each other along the track width direction. In addition, as illustrated in FIG. 4, the first layer 13B1 has a center portion 13B1a including the front end face located in the medium facing surface 30, and two side portions 13B1b and 13B1c that are located at positions outside the center portion 13B1a along the track width direction and that are not exposed at the medium facing surface.

The second layer 13B2 is disposed on the first layer 13B1 and touches the top surface of the first layer 13B1. The second layer 13B2 has a first end face located in the medium facing surface 30, and a second end face opposite to the first end face. The second layer 13B2 corresponds to the second shield layer of the present invention. The sixth layer 13B6 is disposed on the top yoke layer 13B7. The connecting layer 54 is disposed on the connecting layer 53.

The magnetic head further includes a second stopper layer 63 disposed around the second layer 13B2, the sixth layer 1386 and the connecting layer 54. The second stopper layer 63 is a layer for suppressing protrusion of the first end face of the second layer 13B2, and is disposed adjacent to the second end face of the second layer 13B2. The second stopper layer 63 is made of a nonmagnetic material having a linear thermal expansion coefficient of $5\times10^{-6}/°$ C. or smaller at a temperature of 25° C. to 100° C., like the first stopper layer 61. The nonmagnetic material is preferably an inorganic material or a metal material.

As illustrated in FIG. 5, the second stopper layer 63 has a groove 63a that accommodates the second layer 13B2, a groove 63b that accommodates the sixth layer 13B6, and a groove 63c that accommodates the connecting layer 54. The second layer 13B2, the sixth layer 13B6 and the connecting layer 54 are placed in these grooves. The second layer 13B2, the sixth layer 13B6, the connecting layer 54 and the second stopper layer 63 have flattened top surfaces. The second stopper layer 63 have portions adjacent to the top surfaces of the side portions 13B1b and 13B1c of the first layer 13B1.

As illustrated in FIG. 5, the second stopper layer 63 has an end face closer to the medium facing surface 30, and this end face is located at a distance from the medium facing surface 30. The magnetic head further includes an insulating layer 64 disposed between the end face of the second stopper layer 63 and the medium facing surface 30. The insulating layer 64 is made of alumina, for example.

The magnetic head further includes an insulating layer 17 made of an insulating material and disposed on a portion of the top surface of the second stopper layer 63. The insulating layer 17 is made of alumina, for example. The second coil 18 is disposed on the insulating layer 17.

The third layer 13B3 is disposed on the second layer 13B2. The third layer 13B3 has an end face closer to the medium facing surface 30, and this end face is located at a distance from the medium facing surface 30. The fifth layer 13B5 is disposed on the sixth layer 13B6. The second coil 18 is wound around the fifth layer 13B5. The connecting portion 18a of the second coil 18 is disposed on the connecting layer 54.

The magnetic head further includes an insulating layer 19 made of an insulating material and disposed around the coil 18 and in the space between the respective adjacent turns of the coil 18, and an insulating layer 41 made of an insulating material and disposed around the insulating layer 19, the third layer 13B3 and the fifth layer 13B5. A portion of the insulating layer 19 covers the end face of the third layer 13B3 closer to the medium facing surface 30. The third layer 13B3, the fifth layer 13B5, the coil 18 and the insulating layers 19 and 41 have flattened top surfaces. The magnetic head further includes an insulating layer 20 disposed to cover the coil 18 and the insulating layer 19. The insulating layer 19 is made of photoresist, for example. The insulating layers 20 and 41 are made of alumina, for example. The coil 18 is made of a conductive material such as copper.

The fourth layer 13B4 is disposed to couple the third layer 13B3 and the fifth layer 13B5 to each other. The fourth layer 13B4 has an end face closer to the medium facing surface 30, and this end face is located at a distance from the medium facing surface 30.

The magnetic head further includes a third stopper layer 65 disposed to cover the fourth layer 13B4. The third stopper layer 65 has an end face closer to the medium facing surface 30, and this end face is located at a distance from the medium facing surface 30. The third stopper layer 65 is made of a nonmagnetic material having a linear thermal expansion coefficient of $5\times10^{-6}/°$ C. or smaller at a temperature of 25° C. to 100° C., like the first stopper layer 61 and the second stopper layer 63. The nonmagnetic material is preferably an inorganic material or a metal material.

The magnetic head further includes a protection layer 42 made of a nonmagnetic material and disposed to cover the second portion 13B and the third stopper layer 65. The protection layer 42 is made of an inorganic insulating material such as alumina.

As described so far, the magnetic head of this embodiment includes the medium facing surface 30 that faces toward the recording medium, the read head, and the write head. The read head and the write head are stacked on the substrate 1. The read head is disposed backward along the direction T of travel of the recording medium (that is, disposed closer to the air inflow end of the slider), while the write head is disposed forward along the direction T of travel of the recording medium (that is, disposed closer to the air outflow end of the slider).

The read head includes: the MR element 5 as the read element; the bottom shield layer 3 and the top shield layer 7 for shielding the MR element 5, portions of the shield layers 3 and 7 located on a side of the medium facing surface 30 being opposed to each other with the MR element 5 located in between; the bottom shield gap film 4 disposed between the MR element 5 and the bottom shield layer 3; and the top shield gap film 6 disposed between the MR element 5 and the top shield layer 7.

The write head includes the first coil 11, the second coil 18, the pole layer 12, the shield 13, and the gap layer 14.

The pole layer 12 is disposed in the groove 25a of the encasing layer 25 and in the opening 26a of the nonmagnetic metal layer 26, with the nonmagnetic film 27 and the polishing stopper layer 28 disposed in between. The nonmagnetic film 27 has a thickness within a range of 10 to 40 nm, for example. The thickness of the nonmagnetic film 27 is not limited to this range, however, and can be freely chosen depending on the track width. The polishing stopper layer 28 has a thickness within a range of 30 to 100 nm, for example.

The shield 13 includes: the first portion 13A disposed backward of the pole layer 12 along the direction T of travel of the recording medium; the second portion 13B disposed forward of the pole layer 12 along the direction T of travel of the recording medium; and the coupling portions 13C1, 13C2, 13C3 and 13C4. Each of the first portion 13A and the second portion 13B is connected to a portion of the pole layer 12 away from the medium facing surface 30. A portion of the first coil 11 passes through a space surrounded by the pole layer 12 and the first portion 13A. A portion of the second coil 18 passes through a space surrounded by the pole layer 12 and the second portion 13B.

In a region closer to the medium facing surface 30 than is the portion of each of the first coil 11 and the second coil 18, the coupling portions 13C1, 13C2, 13C3 and 13C4 couple the first portion 13A and the second portion 13B to each other without touching the pole layer 12. Specifically, as illustrated in FIG. 3, the coupling portions 13C1, 13C3 and the coupling portions 13C2, 13C4 are disposed on both sides of the pole layer 12 that are opposite to each other along the track width direction, and couple the first layer 13A1 of the first portion 13A and the first layer 13B1 of the second portion 13B to each other.

The second portion 13B includes the first layer 13B1 corresponding to the shield layer of the present invention, and the second layer 13B2 corresponding to the second shield layer of the present invention. The first layer 13B1 has the front end face located in the medium facing surface 30 at a position forward of the end face of the pole layer 12 along the direction T of travel of the recording medium, and the rear end face (located at the right end in FIG. 1) opposite to the front end face. The first layer 13B1 further has the bottom surface adjacent to the gap layer 14, and the top surface opposite to the bottom surface. The second layer 13B2 touches the top surface of the first layer 13B1. The second layer 13B2 has the first end face located in the medium facing surface 30, and the second end face (located at the right end in FIG. 1) opposite to the first end face.

In the medium facing surface 30, the front end face of the first layer 13B1 is located at a predetermined distance from the end face of the pole layer 12, the distance being provided by the thickness of the gap layer 14. The end face of the pole layer 12 has a side that is adjacent to the gap layer 14, and this side defines the track width.

Reference is now made to FIG. 2 and FIG. 4 to describe the shape of the pole layer 12 in detail. As illustrated in FIG. 4, the pole layer 12 includes a track width defining portion 12A having a front end face located in the medium facing surface 30, and a wide portion 12B that is located farther from the medium facing surface 30 than is the track width defining portion 12A and that is greater in width than the track width defining portion 12A. The track width defining portion 12A has a width that does not change in accordance with the distance from the medium facing surface 30. For example, the wide portion 12B is equal in width to the track width defining portion 12A at the boundary with the track width defining portion 12A, and gradually increases in width with increasing distance from the medium facing surface 30 and then maintains a specific width to the end of the wide portion 12B. In the embodiment, the track width defining portion 12A is a portion of the pole layer 12 extending from the end face located in the medium facing surface 30 to the point at which the width of the pole layer 12 starts to increase. Here, the length of the track width defining portion 12A taken in the direction perpendicular to the medium facing surface 30 is called a neck height. The neck height is within a range of 0.05 to 0.3 µm, for example.

As illustrated in FIG. 2, the end face of the pole layer 12 located in the medium facing surface 30 has: a first side A1 closest to the substrate 1; a second side A2 adjacent to the gap layer 14; a third side A3 connecting an end of the first side A1 to an end of the second side A2; and a fourth side A4 connecting the other end of the first side A1 to the other end of the second side A2. The second side A2 defines the track width. The end face of the pole layer 12 located in the medium facing surface 30 has a width that decreases with increasing distance from the gap layer 14. Each of the third side A3 and the fourth side A4 forms an angle within a range of 5 to 15 degrees, for example, with respect to the direction perpendicular to the top surface of the substrate 1. The length of the second side A2, that is, the track width, is within a range of 0.05 to 0.20 µm, for example.

In the embodiment, the throat height is equal to the distance between the medium facing surface 30 and an edge of the bottom surface of the nonmagnetic layer 56 closest to the medium facing surface 30. The throat height is within a range of 0.08 to 0.12 µm, for example.

Reference is now made to FIG. 6A to FIG. 16A, FIG. 6B to FIG. 16B, and FIG. 6C to FIG. 16C to describe a method of manufacturing the magnetic head of the embodiment. FIG. 6A to FIG. 16A, FIG. 6B to FIG. 16B, and FIG. 6C to FIG. 16C each illustrate a stack of layers formed in the course of manufacturing the magnetic head. The portions closer to the substrate 1 than the top shield layer 7 are omitted in FIG. 6A to FIG. 16A, FIG. 6B to FIG. 16B, and FIG. 6C to FIG. 16C. In the method of manufacturing the magnetic head of the embodiment, first, as illustrated in FIG. 1 and FIG. 2, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7 is formed on the top shield gap film 6.

Figure 6A:
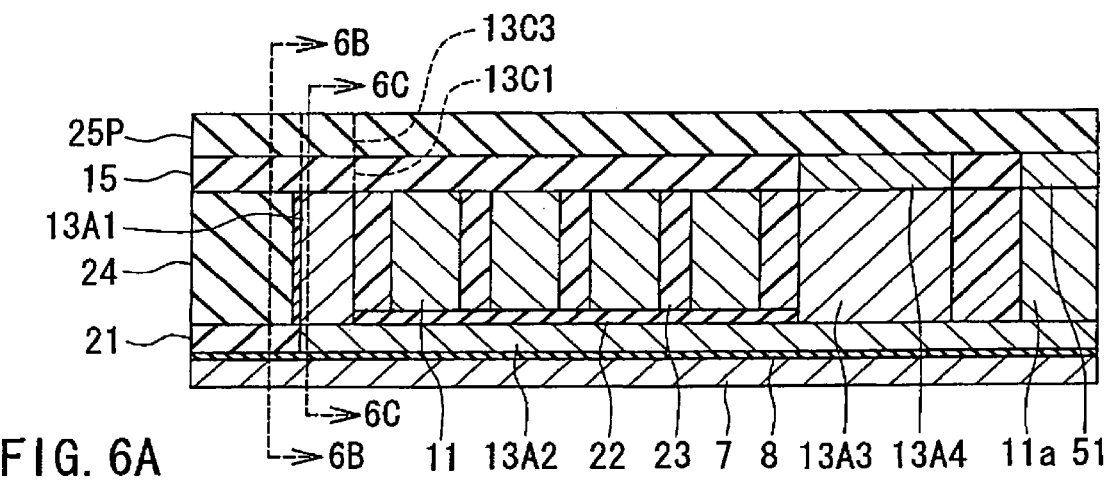
FIG. 6A to FIG. 6C are explanatory views illustrating a step of a method of manufacturing the magnetic head of the first embodiment of the invention.
Figure 6B:
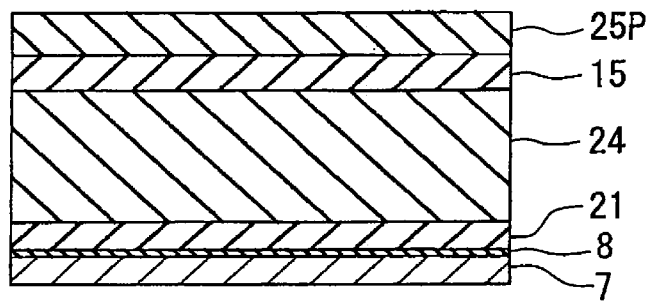
Figure 6C:
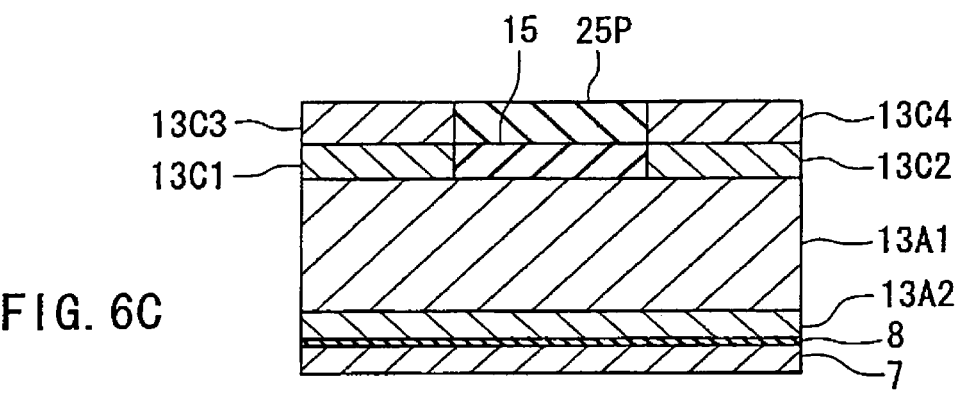

FIG. 6A to FIG. 6C illustrate the next step. FIG. 6A shows a cross section of the stack of layers formed in the course of manufacturing the magnetic head, the cross section being perpendicular to the medium facing surface and the top surface of the substrate. FIG. 6B shows a cross section of the stack of layers taken along line 6B-6B of FIG. 6A, and FIG. 6C shows a cross section of the stack of layers taken along line 6C-6C of FIG. 6A.

In this step, first, the nonmagnetic layer 8 is formed on the top shield layer 7 by sputtering, for example. Next, the second layer 13A2 of the first portion 13A of the shield 13 is formed on the nonmagnetic layer 8 by frame plating, for example. Next, the insulating layer 21 is formed over the entire top surface of the stack of layers. Next, the insulating layer 21 is polished by chemical mechanical polishing (hereinafter referred to as CMP), for example, so that the second layer 13A2 is exposed.

Next, the insulating layer 22 is formed on regions of the top surfaces of the second layer 13A2 and the insulating layer 21 where the coil 11 is to be disposed. Next, the coil 11 is formed on the insulating layer 22 by frame plating, for example. Next, the first layer 13A1 and the third layer 13A3 of the first portion 13A are formed by frame plating, for example. However, the formation of the first layer 13A1 and the third layer 13A3 may precede the formation of the coil 11.

Next, the insulating layer 23 made of photoresist, for example, is selectively formed around the coil 11 and the first layer 13A1 and in the space between the respective adjacent turns of the coil 11. Next, the insulating layer 24 is formed to have a thickness of 3 to 4 μm, for example, over the entire top surface of the stack of layers by sputtering, for example. Next, the insulating layer 24 is polished by CMP, for example, so that the first layer 13A1, the third layer 13A3 and the coil 11 are exposed, and the top surfaces of the first layer 13A1, the third layer 13A3, the coil 11 and the insulating layers 23 and 24 are flattened.

Next, by frame plating, for example, the coupling portions 13C1 and 13C2 are formed on the first layer 13A1, the fourth layer 13A4 is formed on the third layer 13A3, and the connecting layer 51 is formed on the connecting portion 11a of the coil 11. Next, the insulating layer 15 is formed over the entire top surface of the stack of layers by sputtering, for example. Next, the insulating layer 15 is polished by CMP, for example, so that the coupling portions 13C1 and 13C2, the fourth layer 13A4 and the connecting layer 51 are exposed, and the top surfaces of the coupling portions 13C1 and 13C2, the fourth layer 13A4, the connecting layer 51 and the insulating layer 15 are flattened.

Next, by frame plating, for example, the coupling portion 13C3 is formed on the coupling portion 13C1 and the coupling portion 13C4 is formed on the coupling portion 13C2. Next, a nonmagnetic layer 25P is formed over the entire top surface of the stack of layers by sputtering, for example, the nonmagnetic layer 25P being intended to become the encasing layer 25 later by undergoing formation of the groove 25a therein. Next, the nonmagnetic layer 25P is polished by CMP, for example, so that the coupling portions 13C3 and 13C4 are exposed, and the top surfaces of the coupling portions 13C3 and 13C4 and the nonmagnetic layer 25P are flattened.

Figure 7A:
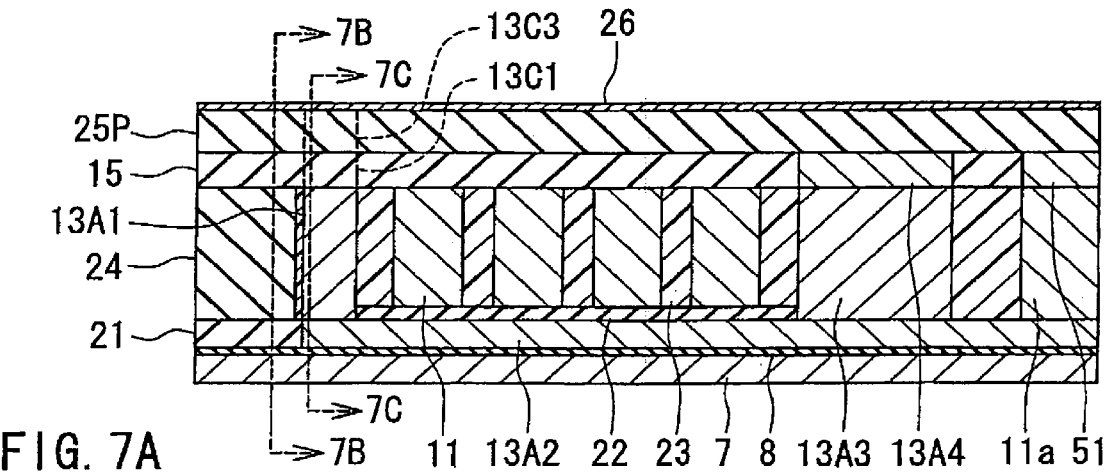
FIG. 7A to FIG. 7C are explanatory views illustrating a step that follows the step of FIG. 6A to FIG. 6C.
Figure 7B:
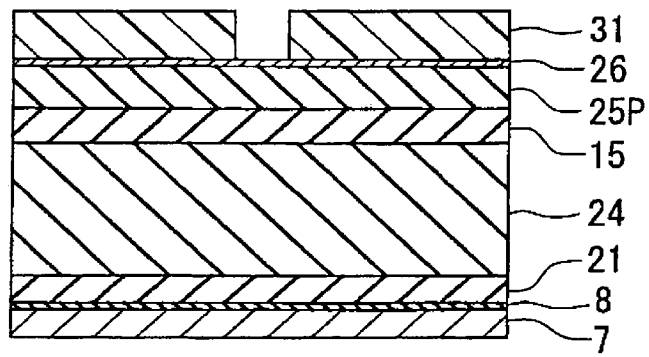
Figure 7C:
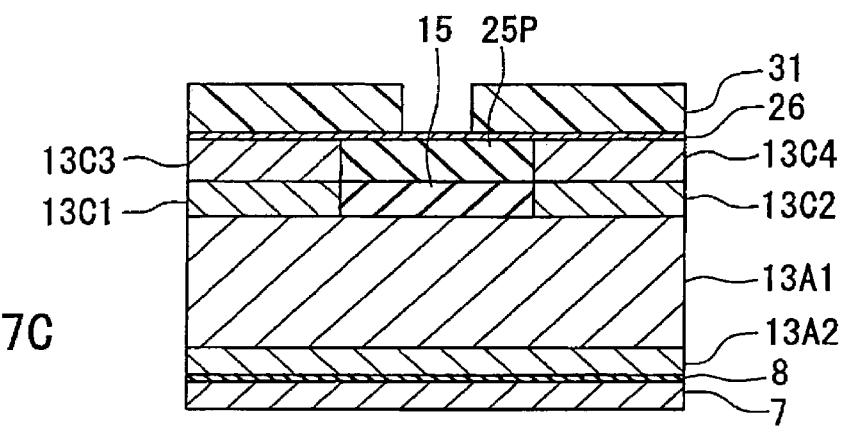

FIG. 7A to FIG. 7C illustrate the next step. FIG. 7A shows a cross section of the stack of layers formed in the course of manufacturing the magnetic head, the cross section being perpendicular to the medium facing surface and the top surface of the substrate. FIG. 7B shows a cross section of the stack of layers taken along line 7B-7B of FIG. 7A, and FIG. 7C shows a cross section of the stack of layers taken along line 7C-7C of FIG. 7A.

In this step, first, the nonmagnetic metal layer 26 is formed on the coupling portions 13C3 and 13C4 and the nonmagnetic layer 25P by sputtering, for example. The nonmagnetic metal layer 26 has a thickness within a range of 40 to 100 nm, for example. Next, a photoresist layer having a thickness of 1.0 μm, for example, is formed on the nonmagnetic metal layer 26. Next, this photoresist layer is patterned to thereby form a mask 31 to be used for forming the groove 25a of the encasing layer 25. The mask 31 has an opening having a shape corresponding to the groove 25a.

Figure 8A:
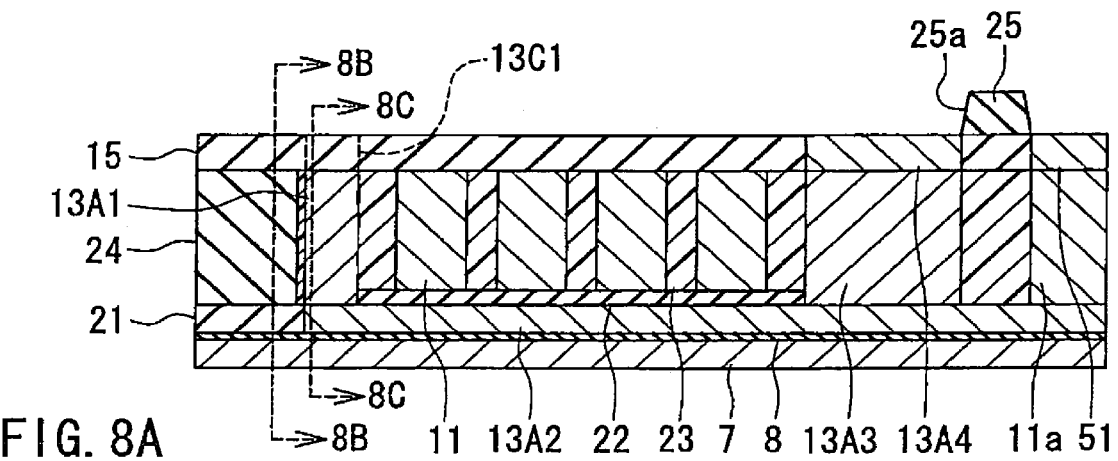
FIG. 8A to FIG. 8C are explanatory views illustrating a step that follows the step of FIG. 7A to FIG. 7C.
Figure 8B:
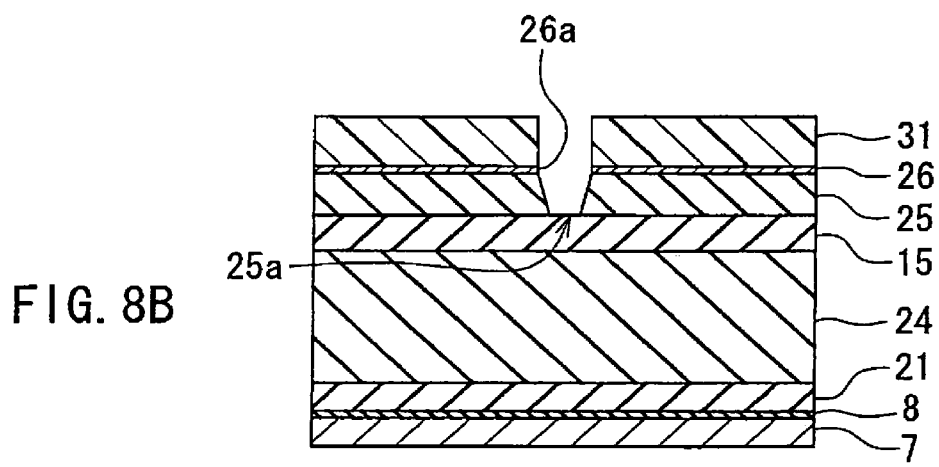
Figure 8C:
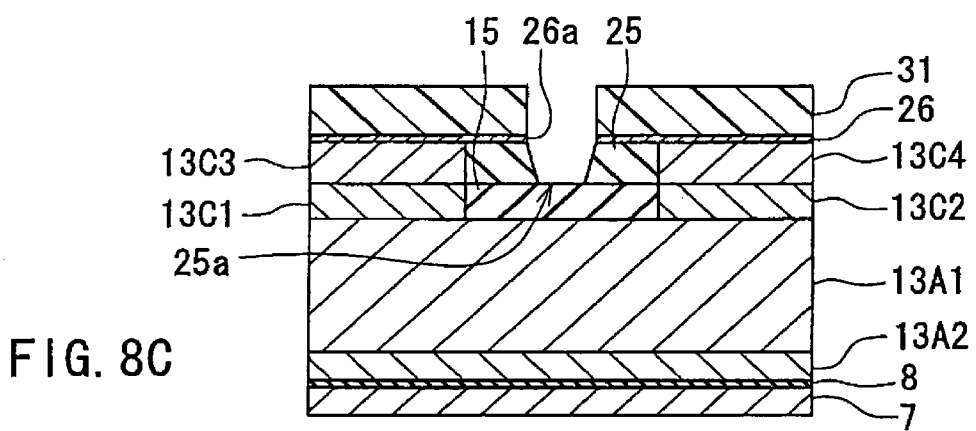

FIG. 8A to FIG. 8C illustrate the next step. FIG. 8A shows a cross section of the stack of layers formed in the course of manufacturing the magnetic head, the cross section being perpendicular to the medium facing surface and the top surface of the substrate. FIG. 8B shows a cross section of the stack of layers taken along line 8B-8B of FIG. 8A, and FIG. 8C shows a cross section of the stack of layers taken along line 8C-8C of FIG. 8A.

In this step, first, the nonmagnetic metal layer 26 is selectively etched using the mask 31. The penetrating opening 26a is thereby formed in the nonmagnetic metal layer 26. The opening 26a has a shape corresponding to the plane geometry of the pole layer 12 to be formed later. A portion of the nonmagnetic layer 25P exposed from the opening 26a of the nonmagnetic metal layer 26 is also selectively etched to thereby form in the nonmagnetic layer 25P the groove 25a and the opening for exposing the top surface of the connecting layer 51. Next, the mask 31 is removed. The nonmagnetic layer 25P becomes the encasing layer 25 as a result of the formation of the groove 25a therein. The edge of the opening 26a of the nonmagnetic metal layer 26 is located directly above the edge of the groove 25a at the top surface of the encasing layer 25.

The etching of each of the nonmagnetic metal layer 26 and the nonmagnetic layer 25P is performed by reactive ion etching (hereinafter referred to as RIE) or ion beam etching (hereinafter referred to as IBE), for example. The etching for forming the groove 25a in the nonmagnetic layer 25P is performed such that the walls of the groove 25a corresponding to both side portions of the track width defining portion 12A of the pole layer 12 each form an angle within a range of 5 to 15 degrees, for example, with respect to the direction perpendicular to the top surface of the substrate 1.

Figure 9A:
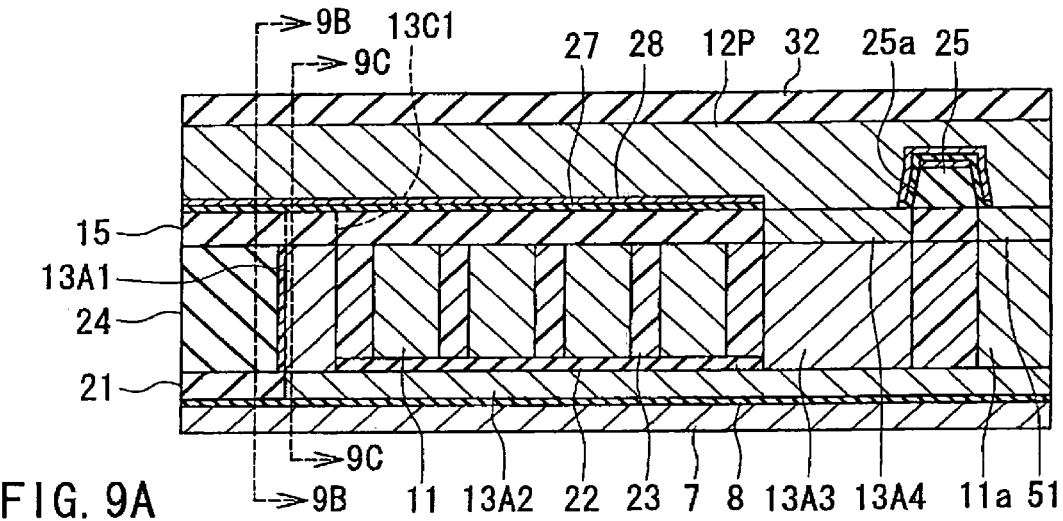
FIG. 9A to FIG. 9C are explanatory views illustrating a step that follows the step of FIG. 8A to FIG. 8C.
Figure 9B:
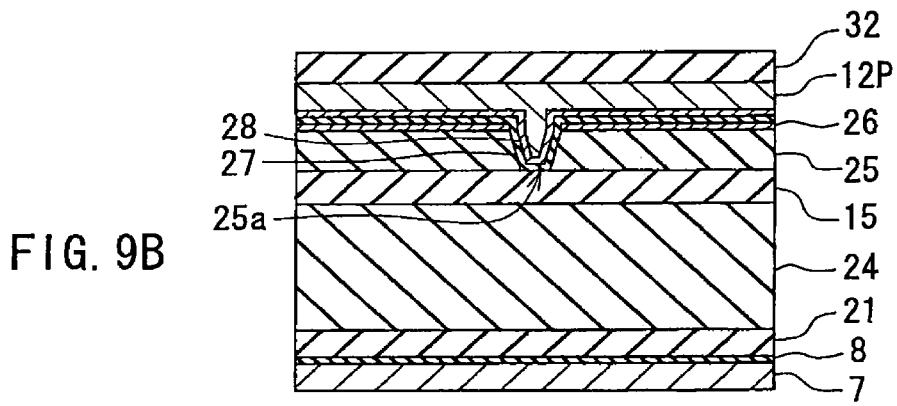
Figure 9C:
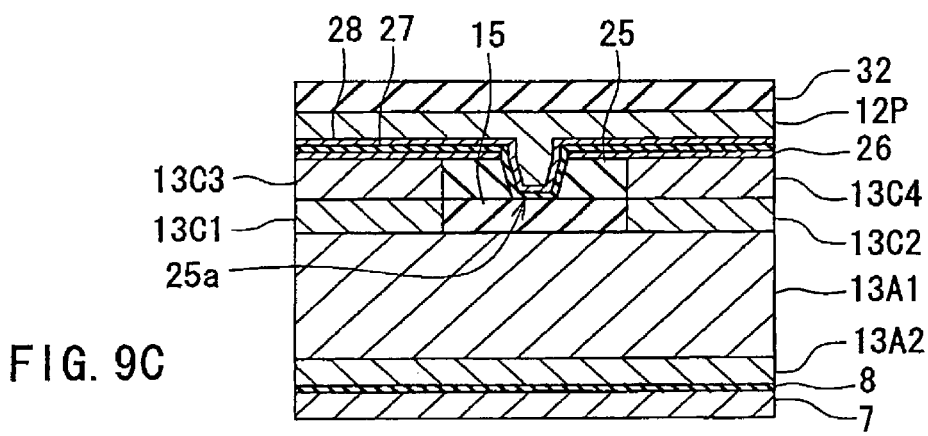

FIG. 9A to FIG. 9C illustrate the next step. FIG. 9A shows a cross section of the stack of layers formed in the course of manufacturing the magnetic head, the cross section being perpendicular to the medium facing surface and the top surface of the substrate. FIG. 9B shows a cross section of the stack of layers taken along line 9B-9B of FIG. 9A, and FIG. 9C shows a cross section of the stack of layers taken along line 9C-9C of FIG. 9A.

In this step, first, the nonmagnetic film 27 is formed over the entire top surface of the stack of layers. The nonmagnetic film 27 is also formed in the groove 25a and the opening of the encasing layer 25. The nonmagnetic film 27 is formed by sputtering or chemical vapor deposition (hereinafter referred to as CVD), for example. The thickness of the nonmagnetic film 27 is precisely controllable. This allows precise control of the track width. In the case of forming the nonmagnetic film 27 by CVD, it is preferred to employ, in particular, so-called atomic layer CVD (hereinafter referred to as ALCVD) in which formation of a single atomic layer is repeated. In this case, it is possible to control the thickness of the nonmagnetic film 27 with higher precision. In the case of forming the nonmagnetic film 27 by ALCVD, it is preferable to employ alumina, in particular, among insulating materials, or Ta or Ru, in particular, among conductive materials, as the material to form the nonmagnetic film 27. In the case of using a semiconductor material to form the nonmagnetic film 27, it is preferred that the nonmagnetic film 27 be formed by ALCVD at low temperatures (around 200° C.) or by low-pressure CVD at low temperatures. The semiconductor material for use to form the nonmagnetic film 27 is preferably undoped polycrystalline silicon or amorphous silicon.

Next, the polishing stopper layer 28 is formed over the entire top surface of the stack of layers. The polishing stopper layer 28 is also formed in the groove 25a and the opening of the encasing layer 25. The polishing stopper layer 28 indicates the level where polishing should be stopped in a polishing step performed later. When the nonmagnetic film 27 is formed of a conductive material, the nonmagnetic film 27 can also function as the polishing stopper layer 28 and the polishing stopper layer 28 can be dispensed with.

When a nonmagnetic conductive material is selected as the material to form the polishing stopper layer 28, the polishing stopper layer 28 is formed by sputtering or CVD, for example. In the case of forming the polishing stopper layer 28 by CVD, it is preferred to employ ALCVD, in particular. In the case of forming the polishing stopper layer 28 by ALCVD using a nonmagnetic conductive material, it is preferred to select Ta or Ru, in particular, as the material to form the polishing stopper layer 28. If formed by ALCVD, the polishing stopper layer 28 provides excellent step coverage. Employing ALCVD to form the polishing stopper layer 28 thus allows the resultant polishing stopper layer 28 to be uniform in the groove 25a of the encasing layer 25. This makes it possible to precisely control the track width. In the case where the polishing stopper layer 28 is formed by ALCVD, the nonmagnetic film 27 for controlling the track width can be dispensed with.

In the case where the polishing stopper layer 28 is formed by ALCVD using a nonmagnetic conductive material, it is also possible to reduce the resistance of the electrode layer (seed layer) used for forming the pole layer 12 by plating. This allows the pole layer 12 to be formed with an accurate thickness.

Next, the nonmagnetic film 27 and the polishing stopper layer 28 are selectively etched to form the openings for exposing the top surface of the fourth layer 13A4 and the openings for exposing the top surface of the connecting layer 51 in the nonmagnetic film 27 and the polishing stopper layer 28.

Next, a magnetic layer 12P that is to become the pole layer 12 and the connecting layer 52 later is formed on the top surface of the stack of layers by frame plating, for example. The magnetic layer 12P is formed such that the top surface thereof is located higher than the respective top surfaces of the nonmagnetic metal layer 26, the nonmagnetic film 27 and the polishing stopper layer 28. Next, a coating layer 32 made of alumina, for example, is formed to have a thickness of 0.5 to 1.2 μm, for example, over the entire top surface of the stack of layers by sputtering, for example.

Figure 10A:
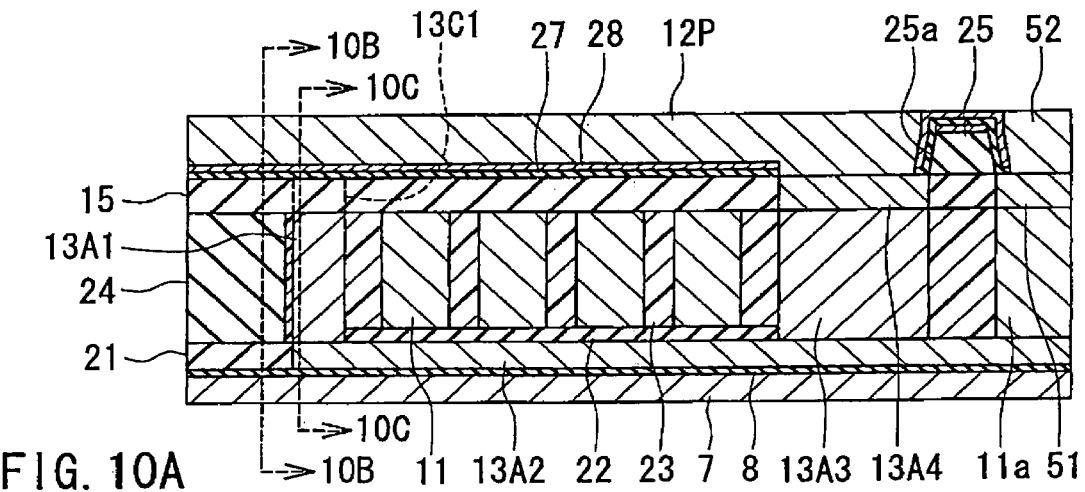
FIG. 10A to FIG. 10C are explanatory views illustrating a step that follows the step of FIG. 9A to FIG. 9C.
Figure 10B:
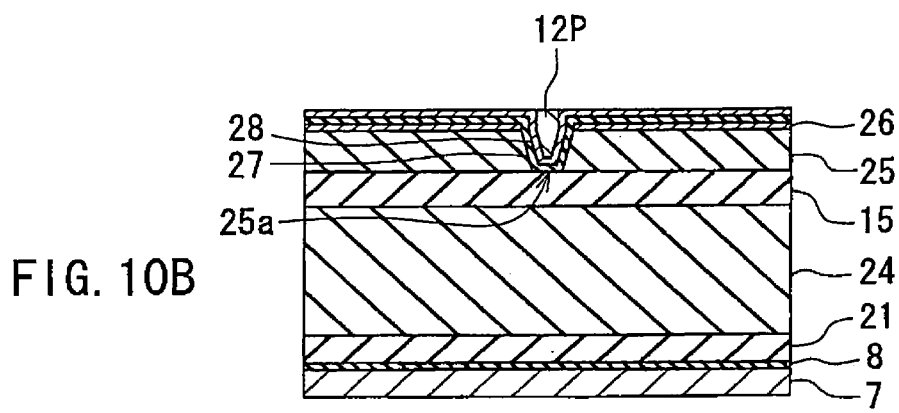
Figure 10C:
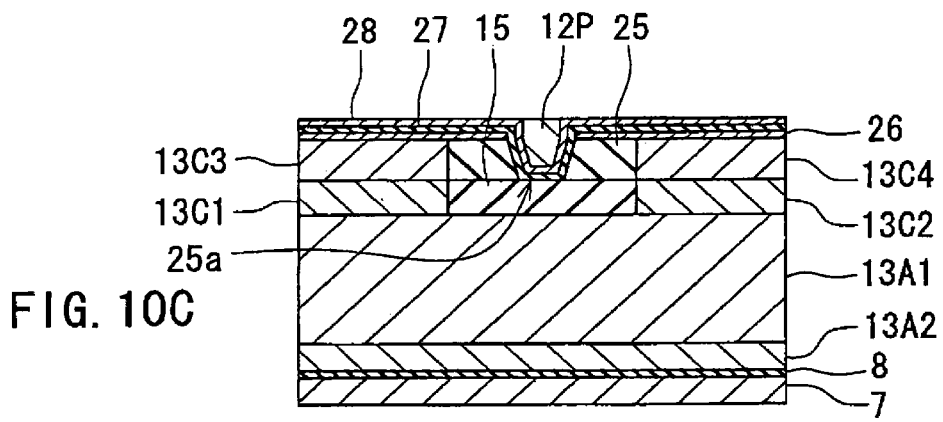

FIG. 10A to FIG. 10C illustrate the next step. FIG. 10A shows a cross section of the stack of layers formed in the course of manufacturing the magnetic head, the cross section being perpendicular to the medium facing surface and the top surface of the substrate. FIG. 10B shows a cross section of the stack of layers taken along line 10B-10B of FIG. 10A, and FIG. 10C shows a cross section of the stack of layers taken along line 10C-10C of FIG. 10A.

In this step, the coating layer 32 and the magnetic layer 12P are polished by CMP, for example, until the polishing stopper layer 28 is exposed. In the case of polishing the coating layer 32 and the magnetic layer 12P by CMP, such a slurry is used that polishing is stopped when the polishing stopper layer 28 is exposed, such as an alumina-base slurry. As a result of this polishing, a portion of the magnetic layer 12P located on the connecting layer 51 becomes the connecting layer 52.

Figure 11A:
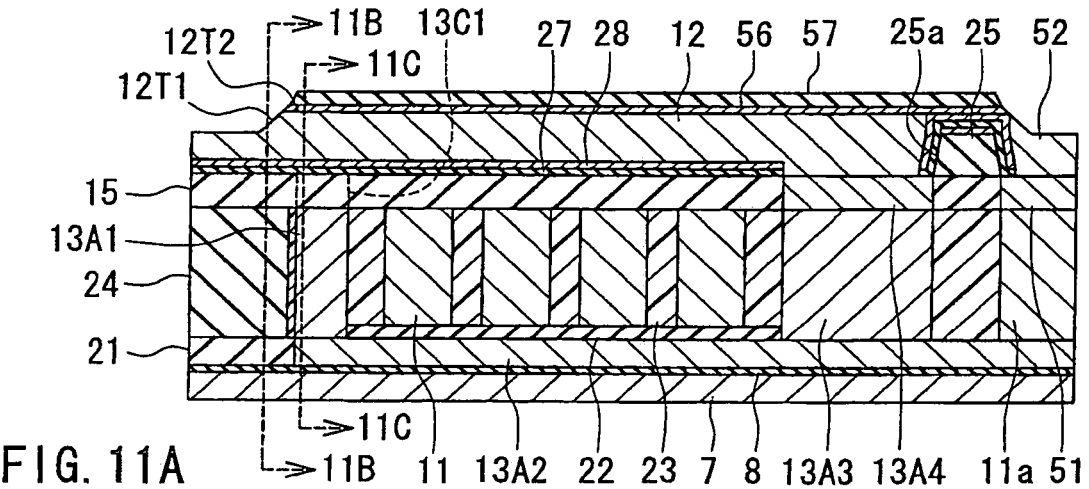
FIG. 11A to FIG. 11C are explanatory views illustrating a step that follows the step of FIG. 10A to FIG. 10C.
Figure 11B:
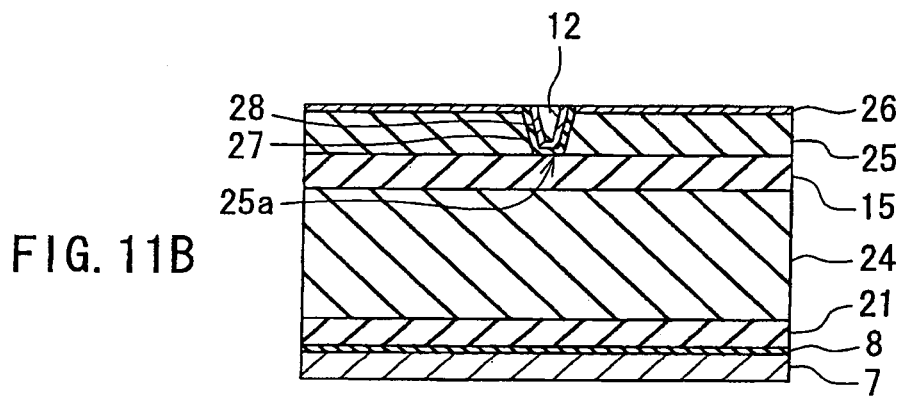
Figure 11C:
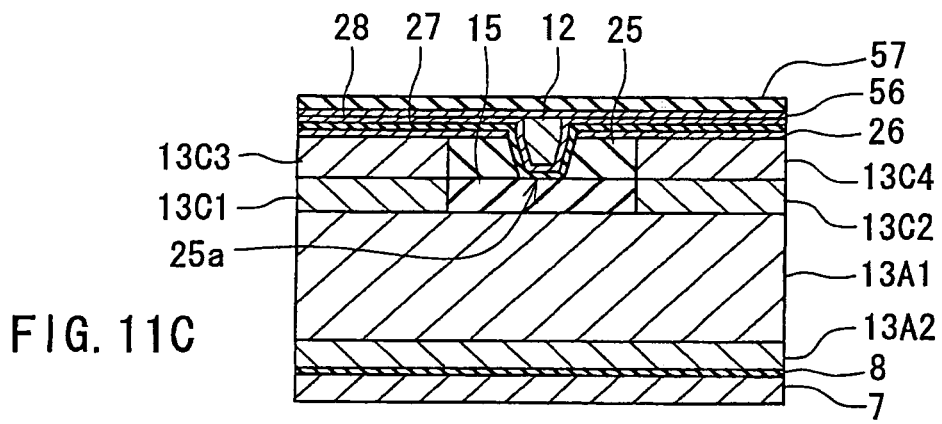

FIG. 11A to FIG. 11C illustrate the next step. FIG. 11A shows a cross section of the stack of layers formed in the course of manufacturing the magnetic head, the cross section being perpendicular to the medium facing surface and the top surface of the substrate. FIG. 11B shows a cross section of the stack of layers taken along line 11B-11B of FIG. 11A, and FIG. 11C shows a cross section of the stack of layers taken along line 11C-11C of FIG. 11A.

In this step, a first nonmagnetic film is formed over the entire top surface of the stack of layers by sputtering, for example, the first nonmagnetic film being intended to undergo partial etching later to thereby become the nonmagnetic layer 56. Next, a second nonmagnetic film is formed on the first nonmagnetic film by sputtering, for example, the second nonmagnetic film being intended to undergo partial etching later to thereby become the nonmagnetic layer 57. Next, a photoresist layer having a thickness of 1.0 μm, for example, is formed on the second nonmagnetic film. Next, this photoresist layer is patterned to thereby form a mask for patterning the second nonmagnetic film. Using this mask, the second nonmagnetic film is then partially etched by RIE, for example. The etching of the second nonmagnetic film is performed such that the bottom of the groove formed by the etching reaches the top surface of the first nonmagnetic film and the etching is stopped at that level. Therefore, a material whose etching rate is lower than that of the second nonmagnetic film when the second nonmagnetic film is partially etched is selected as the material to form the first nonmagnetic film. Specifically, for example, Ru, NiCr or NiCu is used as the material to form the first nonmagnetic film, while alumina or silicon oxide is used as the material to form the second nonmagnetic film. Next, the mask is removed. As a result of being partially etched, the second nonmagnetic film becomes the nonmagnetic layer 57. Next, the first nonmagnetic film is partially etched by IBE, for example, using the nonmagnetic layer 57 as a mask. As a result, the first nonmagnetic film becomes the nonmagnetic layer 56.

Next, the magnetic layer 12P is partially etched by IBE, for example, using the nonmagnetic layer 56 as a mask. As a result, the first portion 12T1 and the second portion 12T2 are formed in the top surface of the magnetic layer 12P, whereby the magnetic layer 12P becomes the pole layer 12.

Figure 12A:
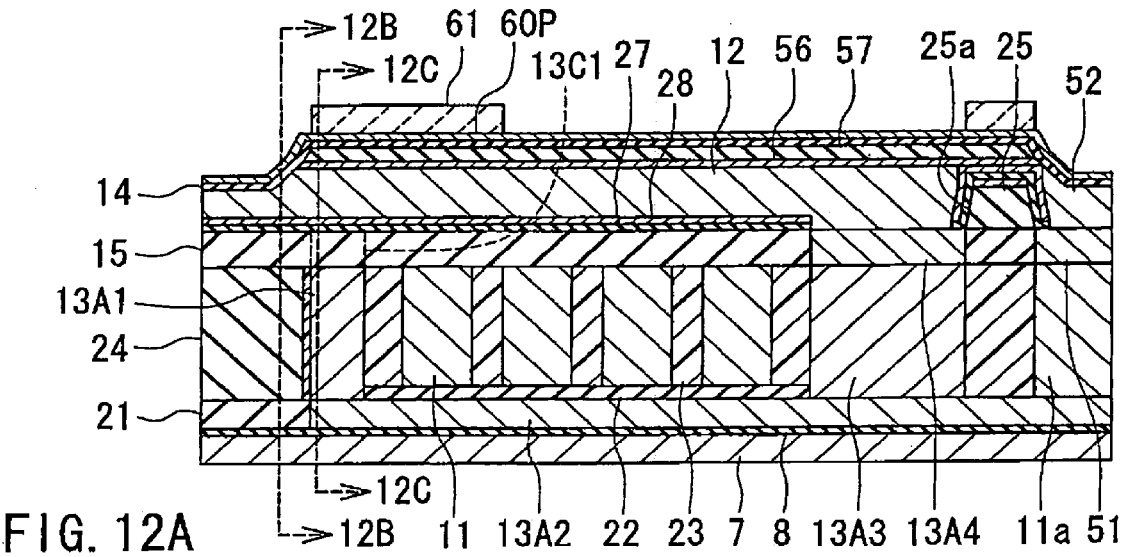
FIG. 12A to FIG. 12C are explanatory views illustrating a step that follows the step of FIG. 11A to FIG. 11C.
Figure 12B:
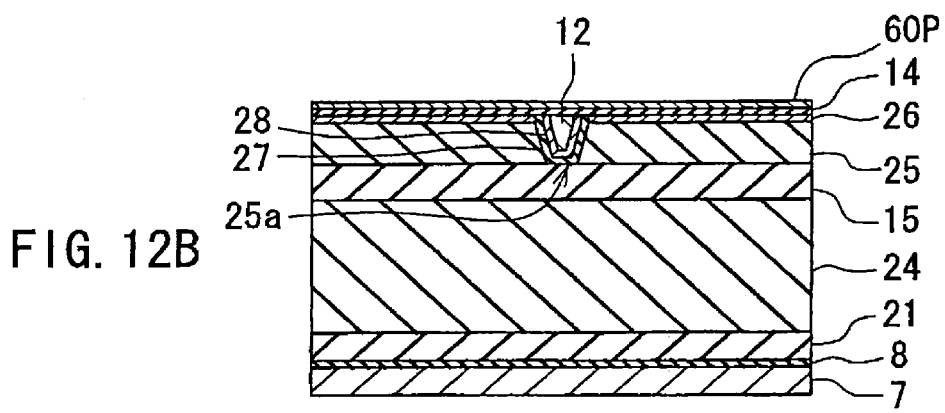
Figure 12C:
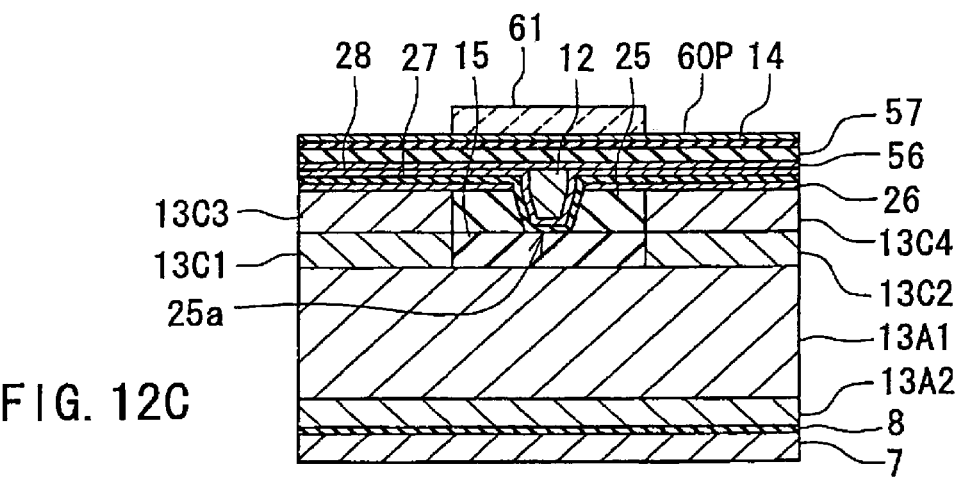

FIG. 12A to FIG. 12C illustrate the next step. FIG. 12A shows a cross section of the stack of layers formed in the course of manufacturing the magnetic head, the cross section being perpendicular to the medium facing surface and the top surface of the substrate. FIG. 12B shows a cross section of the stack of layers taken along line 12B-12B of FIG. 12A, and FIG. 12C shows a cross section of the stack of layers taken along line 12C-12C of FIG. 12A.

In this step, first, the gap layer 14 is formed over the entire top surface of the stack of layers. The gap layer 14 is formed by sputtering or CVD, for example. Next, an etching stopper film 60P is formed on the gap layer 14 by sputtering, for example, the film 60P being intended to undergo partial etching later to thereby become the nonmagnetic layer 60.

Next, a nonmagnetic film is formed on the etching stopper film 60P by sputtering, for example, the nonmagnetic film being intended to undergo partial etching later to thereby become the first stopper layer 61. Next, a photoresist layer is formed over the entire top surface of the stack of layers. Next, this photoresist layer is patterned to thereby form a mask to be used for etching the nonmagnetic film to become the first stopper layer 61. Using this mask, the nonmagnetic film is then partially etched by RIE, for example. The etching of the nonmagnetic film is performed such that the bottom of each groove formed by the etching reaches the top surface of the etching stopper film 60P and the etching is stopped at that level. The etched portions of the nonmagnetic film become the grooves of the first stopper layer 61, while the remainder of the nonmagnetic film becomes the first stopper layer 61. The mask is then removed.

Figure 13A:
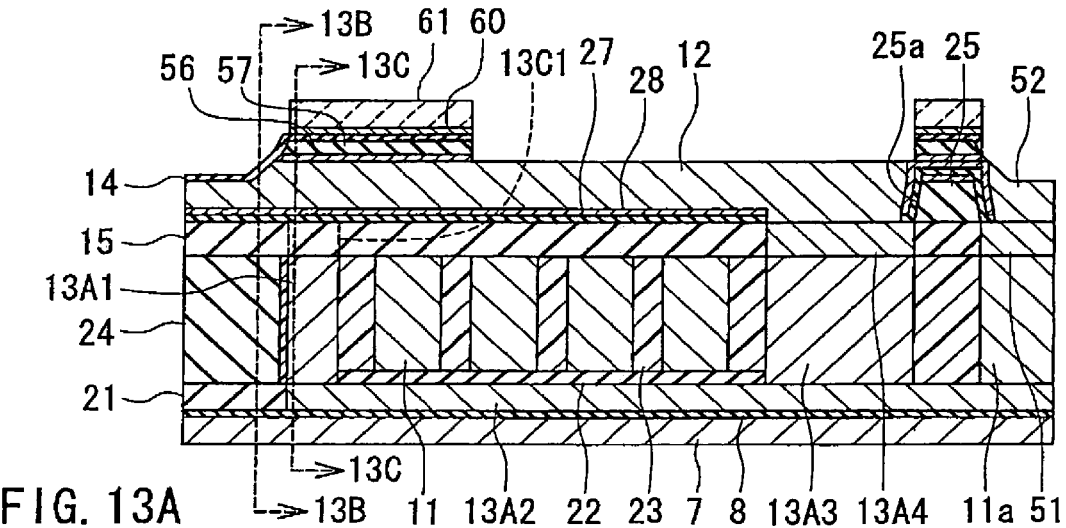
FIG. 13A to FIG. 13C are explanatory views illustrating a step that follows the step of FIG. 12A to FIG. 12C.
Figure 13B:
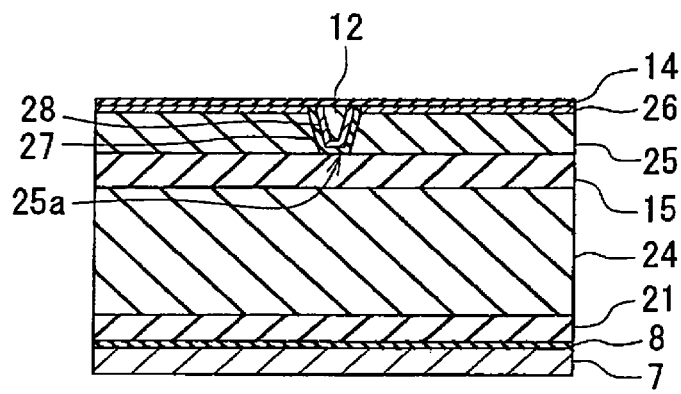
Figure 13C:
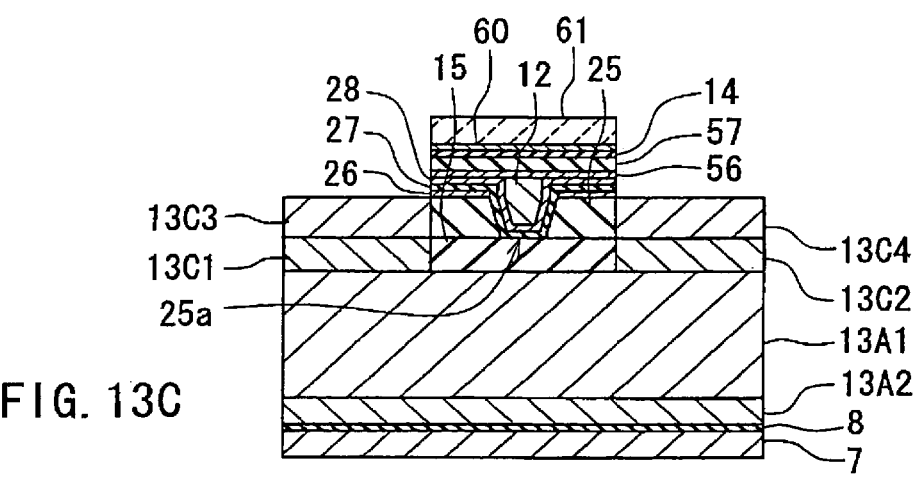

FIG. 13A to FIG. 13C illustrate the next step. FIG. 13A shows a cross section of the stack of layers formed in the course of manufacturing the magnetic head, the cross section being perpendicular to the medium facing surface and the top surface of the substrate. FIG. 13B shows a cross section of the stack of layers taken along line 13B-13B of FIG. 13A, and FIG. 13C shows a cross section of the stack of layers taken along line 13C-13C of FIG. 13A.

In this step, first, the etching stopper film 60P except a portion thereof located below the first stopper layer 61 is removed by IBE, for example, using the first stopper layer 61 as a mask. As a result, the remaining portion of the etching stopper film 60P becomes the nonmagnetic layer 60. Next, the gap layer 14, the nonmagnetic metal layer 26, the nonmagnetic film 27 and the polishing stopper layer 28 are selectively etched by IBE, for example, so that a portion of the top surface of the pole layer 12 and the top surfaces of the coupling portions 13C3 and 13C4 and the connecting layer 52 are exposed.

Figure 14A:
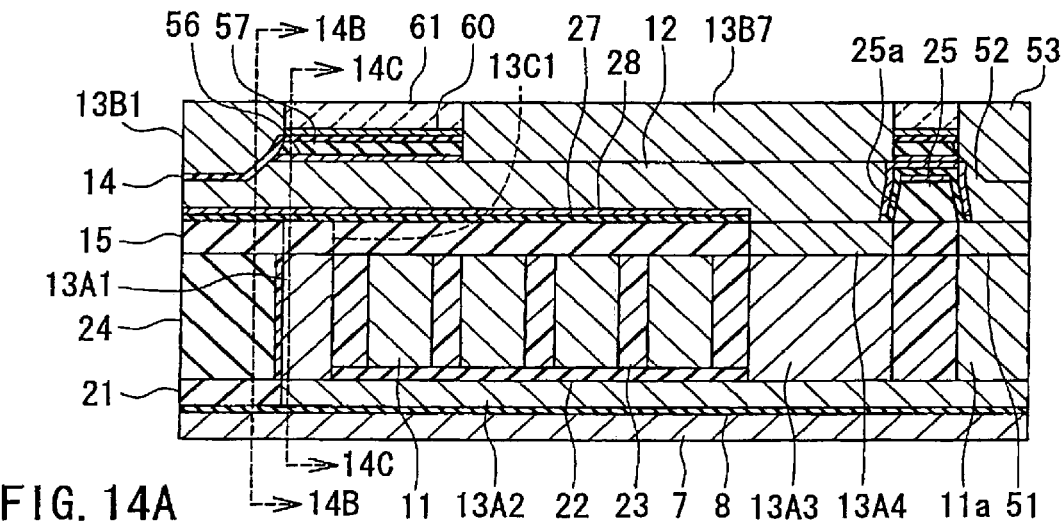
FIG. 14A to FIG. 14C are explanatory views illustrating a step that follows the step of FIG. 13A to FIG. 13C.
Figure 14B:
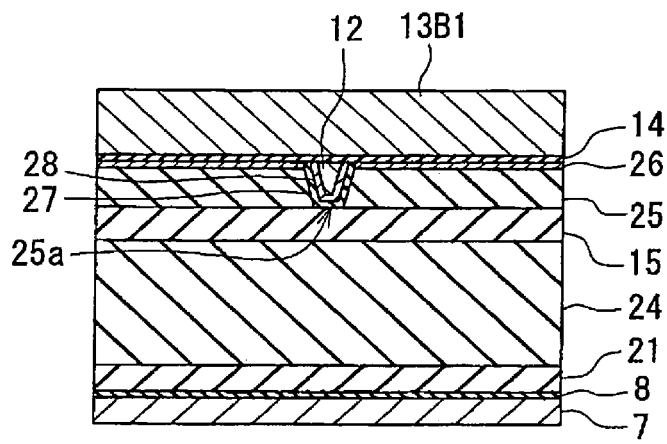
Figure 14C:
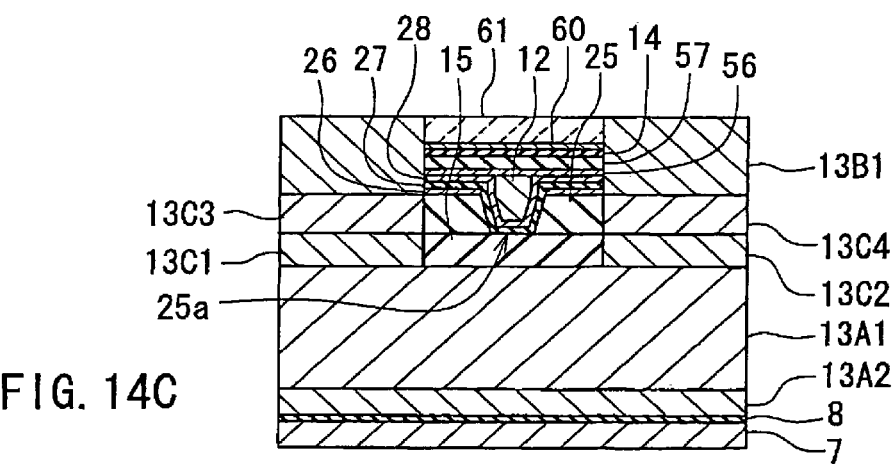
Figure 17:
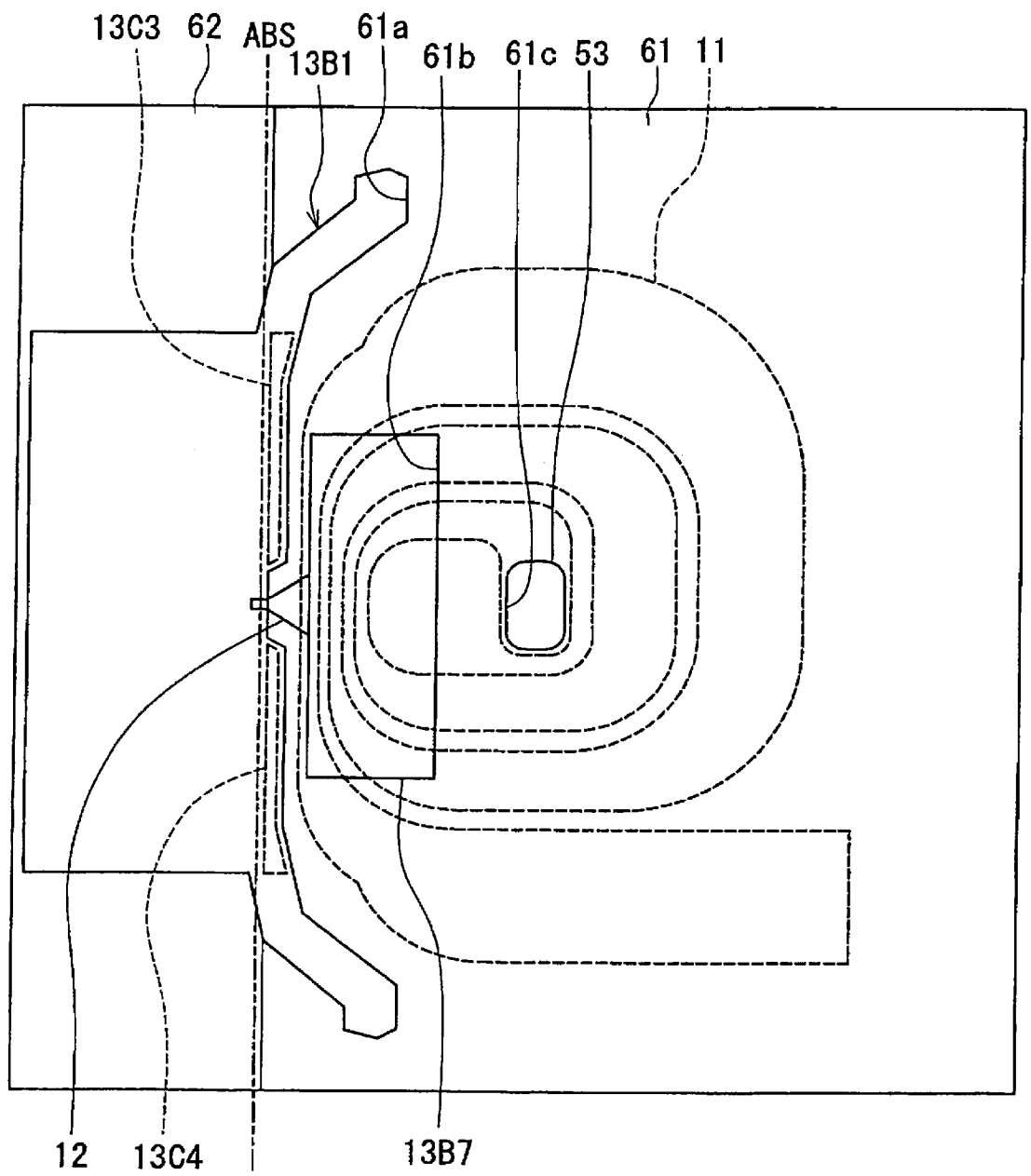
FIG. 17 is a top view of the stack of layers illustrated in FIG. 14A.

FIG. 14A to FIG. 14C and FIG. 17 illustrate the next step. FIG. 14A shows a cross section of the stack of layers formed in the course of manufacturing the magnetic head, the cross section being perpendicular to the medium facing surface and the top surface of the substrate. FIG. 14B shows a cross section of the stack of layers taken along line 14B-14B of FIG. 14A, and FIG. 14C shows a cross section of the stack of layers taken along line 14C-14C of FIG. 14A. FIG. 17 is a top view of the stack of layers of FIG. 14A.

In this step, first, a magnetic film is formed over the entire top surface of the stack of layers by frame plating, for example, the magnetic film being intended to become the first layer 13B1, the top yoke layer 13B7 and the connecting layer 53 later. This magnetic film is formed such that the grooves of the first stopper layer 61 are filled with this magnetic film and that the top surface of this magnetic film is located higher than the top surface of the first stopper layer 61. Next, the insulating layer 62 is formed over the entire top surface of the stack of layers by sputtering, for example.

Next, the insulating layer 62 and the magnetic film are polished by CMP, for example, so that the top surface of the first stopper layer 61 is exposed. As a result, the first layer 13B1, the top yoke layer 13B7 and the connecting layer 53 are formed by the magnetic film remaining in the grooves of the first stopper layer 61. Furthermore, as a result of this polishing, the top surfaces of the first layer 13B1, the top yoke layer 13B7, the connecting layer 53, the first stopper layer 61 and the insulating layer 62 are flattened.

Figure 15A:
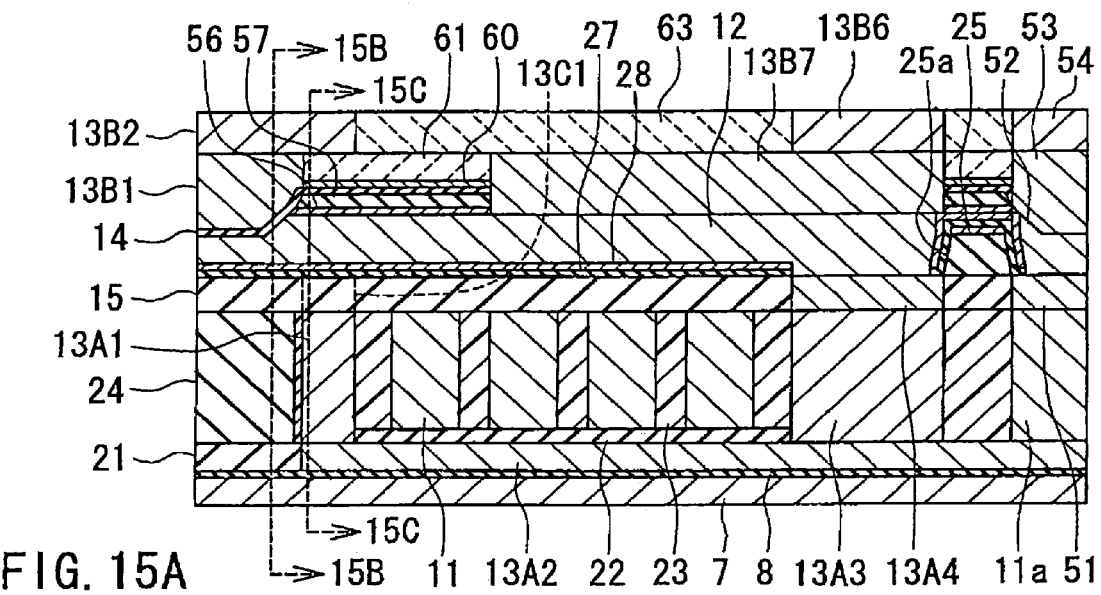
FIG. 15A to FIG. 15C are explanatory views illustrating a step that follows the step of FIG. 14A to FIG. 14C.
Figure 15B:
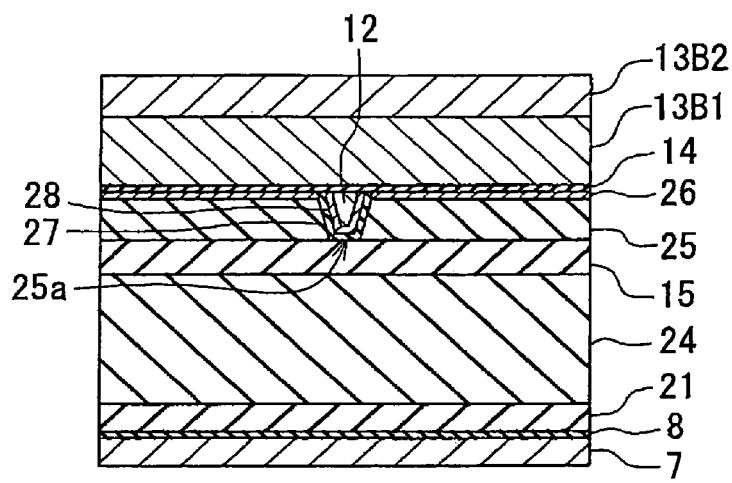
Figure 15C:
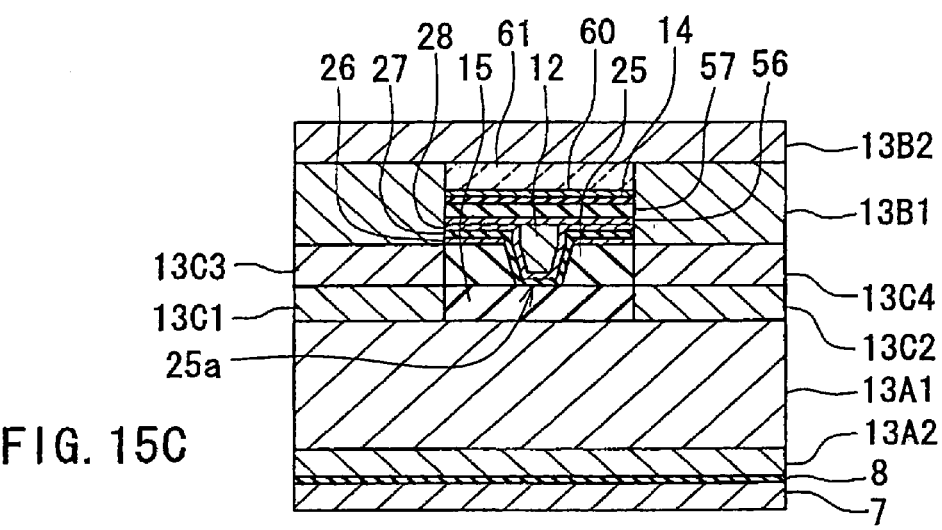
Figure 18:
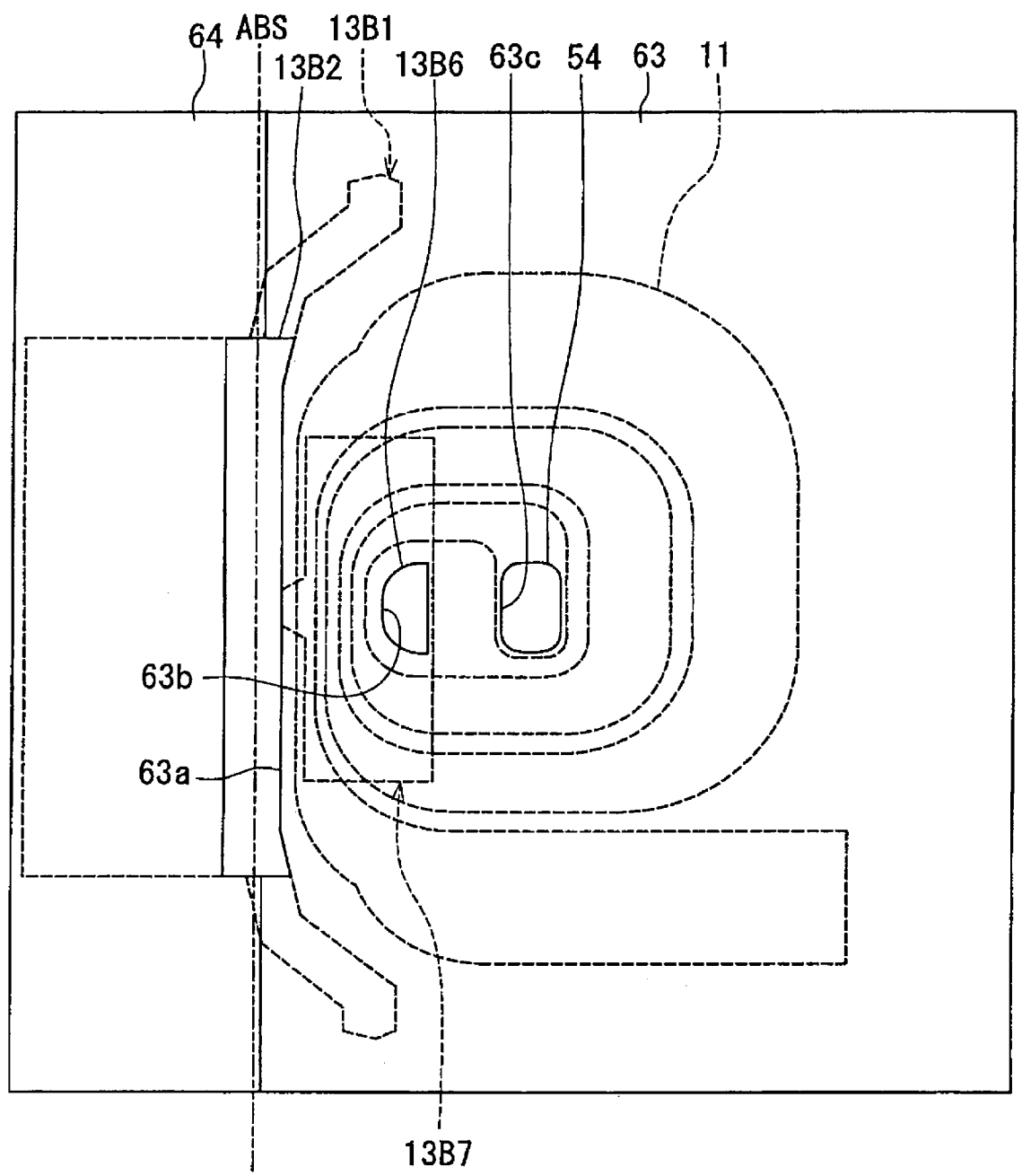
FIG. 18 is a top view of the stack of layers illustrated in FIG. 15A.

FIG. 15A to FIG. 15C and FIG. 18 illustrate the next step. FIG. 15A shows a cross section of the stack of layers formed in the course of manufacturing the magnetic head, the cross section being perpendicular to the medium facing surface and the top surface of the substrate. FIG. 15B shows a cross section of the stack of layers taken along line 15B-15B of FIG. 15A, and FIG. 15C shows a cross section of the stack of layers taken along line 15C-15C of FIG. 15A. FIG. 18 is a top view of the stack of layers of FIG. 15A.

In this step, first formed is a nonmagnetic film that is to undergo partial etching later to thereby become the second stopper layer 63. Next, a photoresist layer is formed over the entire top surface of the stack of layers. Next, this photoresist layer is patterned to thereby form a mask to be used for etching the nonmagnetic film to become the second stopper layer 63. Using this mask, the nonmagnetic film is then partially etched by RIE, for example. The etched portions of the nonmagnetic film become the grooves of the second stopper layer 63, while the remainder of the nonmagnetic film becomes the second stopper layer 63. The mask is then removed.

Next, a magnetic film is formed over the entire top surface of the stack of layers by frame plating, for example, the magnetic film being intended to become the second layer 13B2, the sixth layer 13B6 and the connecting layer 54 later.

This magnetic film is formed such that the grooves of the second stopper layer 63 are filled with this magnetic film and that the top surface of this magnetic film is located higher than the top surface of the second stopper layer 63. Next, the insulating layer 64 is formed over the entire top surface of the stack of layers by sputtering, for example.

Next, the insulating layer 64 and the magnetic film are polished by CMP, for example, so that the top surface of the second stopper layer 63 is exposed. As a result, the second layer 13B2, the sixth layer 13B6 and the connecting layer 54 are formed by the magnetic film remaining in the grooves of the second stopper layer 63. Furthermore, as a result of this polishing, the top surfaces of the second layer 13B2, the sixth layer 13B6, the connecting layer 54, the second stopper layer 63 and the insulating layer 64 are flattened.

Figure 16A:
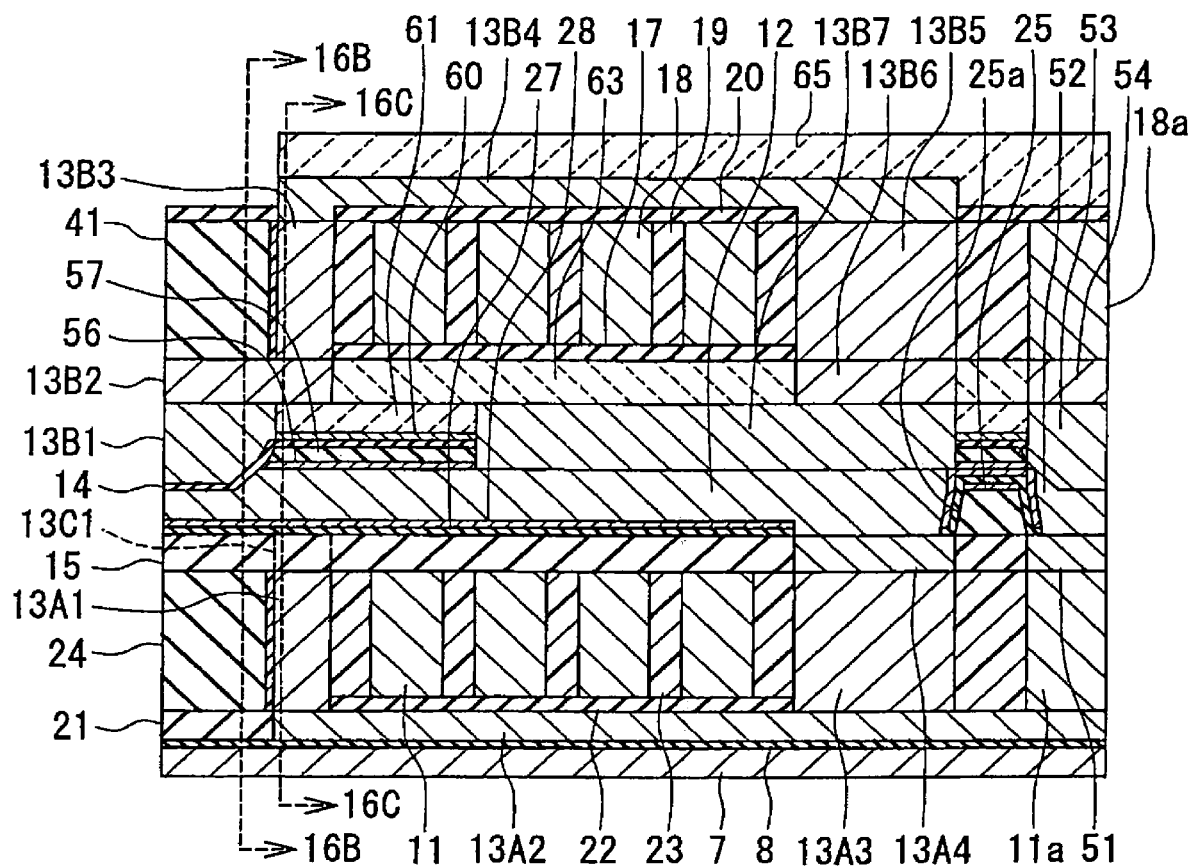
FIG. 16A to FIG. 16C are explanatory views illustrating a step that follows the step of FIG. 15A to FIG. 15C.
Figure 16B:
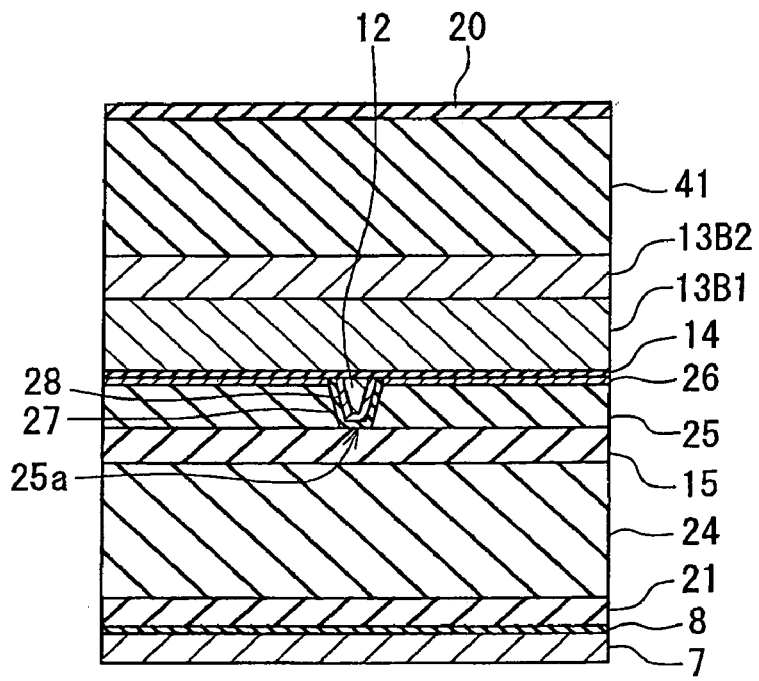
Figure 16C:
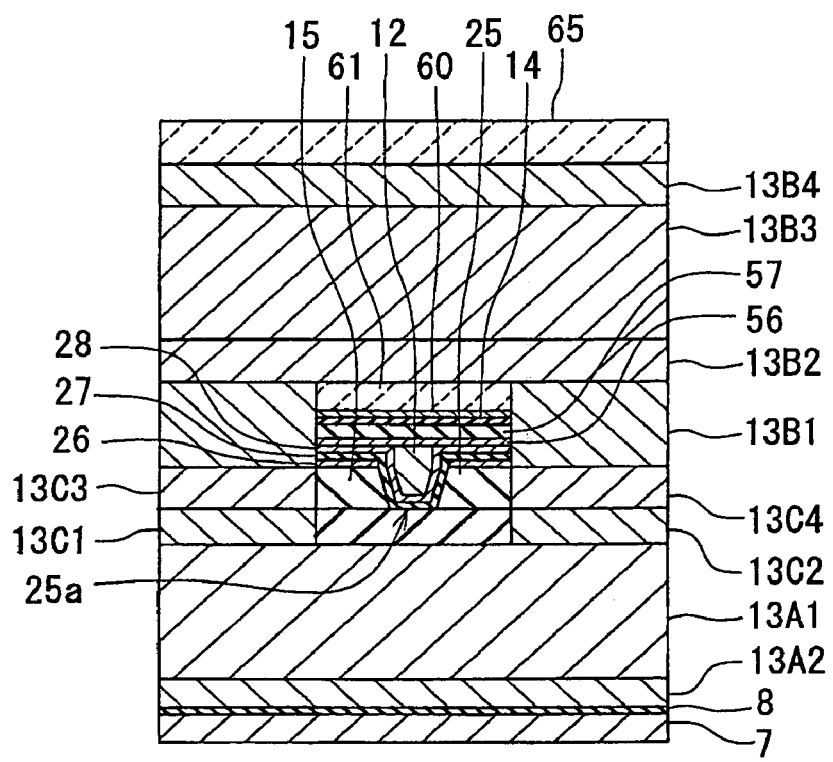

FIG. 16A to FIG. 16C illustrate the next step. FIG. 16A shows a cross section of the stack of layers formed in the course of manufacturing the magnetic head, the cross section being perpendicular to the medium facing surface and the top surface of the substrate. FIG. 16B shows a cross section of the stack of layers taken along line 16B-16B of FIG. 16A, and FIG. 16C shows a cross section of the stack of layers taken along line 16C-16C of FIG. 16A.

In this step, first, the insulating layer 17 is formed on a region of the top surface of the second stopper layer 63 where the coil 18 is to be disposed. Next, the coil 18 is formed on the insulating layer 17 by frame plating, for example. Next, the third layer 13B3 and the fifth layer 13B5 of the second portion 13B are formed by frame plating, for example. However, the formation of the third layer 13B3 and the fifth layer 13B5 may precede the formation of the coil 18.

Next, the insulating layer 19 made of photoresist, for example, is selectively formed around the coil 18 and the third layer 13B3 and in the space between the respective adjacent turns of the coil 18. Next, the insulating layer 41 is formed to have a thickness of 3 to 4 µm, for example, over the entire top surface of the stack of layers by sputtering, for example. Next, the insulating layer 41 is polished by CMP, for example, so that the third layer 13B3, the fifth layer 13B5 and the coil 18 are exposed, and the top surfaces of the third layer 13B3, the fifth layer 13B5, the coil 18 and the insulating layers 19 and 41 are flattened.

Next, the insulating layer 20 is formed over the entire top surface of the stack of layers by sputtering, for example. Next, the insulating layer 20 is selectively etched to thereby form in the insulating layer 20 the opening for exposing the top surface of the third layer 13B3 and the opening for exposing the top surface of the fifth layer 13B5. Next, the fourth layer 13B4 of the second portion 13B is formed by frame plating, for example, whereby the shield 13 is completed.

Next, the third stopper layer 65 is formed to cover the fourth layer 13B4. The method of forming the third stopper layer 65 is the same as the method of forming the second stopper layer 63.

Next, as illustrated in FIG. 1, the protection layer 42 is formed to cover the entire top surface of the stack of layers. Next, wiring and terminals are formed on the protection layer 42, the substrate is cut into sliders, and the steps including polishing of the medium facing surface 30 and fabrication of flying rails are performed, whereby the magnetic head is completed.

The operation and effects of the magnetic head of the embodiment will now be described. In the magnetic head, the write head writes data on a recording medium while the read head reads data written on the recording medium. In the write head, the coils 11 and 18 generate magnetic fields corresponding to data to be written on the recording medium. A magnetic flux corresponding to the magnetic field generated by the coil 11 passes through the first portion 13A of the shield 13 and the pole layer 12. A magnetic flux corresponding to the magnetic field generated by the coil 18 passes through the second portion 13B of the shield 13 and the pole layer 12. Consequently, the pole layer 12 allows the magnetic flux corresponding to the magnetic field generated by the coil 11 and the magnetic flux corresponding to the magnetic field generated by the coil 18 to pass.

The coils 11 and 18 may be connected in series or in parallel. In either case, the coils 11 and 18 are connected such that the magnetic flux corresponding to the magnetic field generated by the coil 11 and the magnetic flux corresponding to the magnetic field generated by the coil 18 flow in the same direction in the pole layer 12.

The pole layer 12 allows the magnetic fluxes corresponding to the magnetic fields generated by the coils 11 and 18 to pass as mentioned above, and generates a write magnetic field used for writing data on the recording medium by means of the perpendicular magnetic recording system.

The shield 13 takes in a disturbance magnetic field applied to the magnetic head from outside of the magnetic head. As a result, it is possible to prevent erroneous writing on the recording medium induced by the disturbance magnetic field intensively taken into the pole layer 12. Furthermore, the shield 13 has a function of taking in a magnetic flux that is generated from the end face of the pole layer 12 and that expands in directions except the direction perpendicular to the plane of the recording medium, and thus preventing this magnetic flux from reaching the recording medium. The shield 13 also has a function of returning a magnetic flux that has been generated from the end face of the pole layer 12 and has magnetized the recording medium.

The shield 13 includes the first portion 13A disposed backward of the pole layer 12 along the direction T of travel of the recording medium, and the second portion 13B disposed forward of the pole layer 12 along the direction T of travel of the recording medium. Consequently, according to the embodiment, in regions both backward and forward of the end face of the pole layer 12 along the direction T of travel of the recording medium, it is possible to take in the magnetic flux that is generated from the end face of the pole layer 12 and that expands in directions except the direction perpendicular to the plane of the recording medium, and to thereby prevent this flux from reaching the recording medium. As a result, according to the embodiment, a phenomenon of attenuation of signals written on one or more tracks adjacent to a track targeted for writing or reading can be suppressed over a wide range along the track width direction.

Furthermore, in the embodiment, magnetic fluxes corresponding to the magnetic fields generated by the two coils 11 and 18 pass through the pole layer 12. Consequently, according to the embodiment, it is possible to make the number of turns of each of the coils 11 and 18 smaller than that of a single coil of a magnetic head in which the coil is the only one coil provided. This makes it possible to reduce the resistance of each of the coils 11 and 18 and to thereby reduce the heat value of each of the coils 11 and 18. As a result, according to the embodiment, it is possible to suppress protrusion of a portion of the medium facing surface 30 induced by the heat generated by the coils 11 and 18.

The position of an end of the bit pattern to be written on the recording medium is determined by the position of one end of the end face of the pole layer 12 located in the medium facing surface 30, the one end being located forward along the direction T of travel of the recording medium. Therefore, to define the position of the end of the bit pattern precisely, it is important to take in a magnetic flux, particularly at a position forward of the end face of the pole layer 12 along the direction T of travel of the recording medium, the flux being generated from the end face of the pole layer 12 and expanding in directions except the direction perpendicular to the plane of the recording medium, and to thereby prevent this flux from reaching the recording medium. In the embodiment, an end face of the first portion 13A of the shield 13 closer to the medium facing surface 30 is located at a distance from the medium facing surface 30, while an end face of the second portion 13B of the shield 13 is located in the medium facing surface 30. The end face of the second portion 13B is located forward of the end face of the pole layer 12 along the direction T of travel of the recording medium, with a predetermined small distance provided therebetween by the thickness of the gap layer 14. As a result, particularly at a position forward of the end face of the pole layer 12 along the direction T of travel of the recording medium, it is possible to effectively take in the magnetic flux generated from the end face of the pole layer 12 and expanding in directions except the direction perpendicular to the plane of the recording medium, and to thereby prevent the flux from reaching the recording medium. Furthermore, in the embodiment, the first portion 13A and the second portion 13B of the shield 13 are coupled to each other by the coupling portions 13C1, 13C2, 13C3 and 13C4. Consequently, the magnetic flux taken in at the end face of the second portion 13B can pass not only through the second portion 13B but also through the first portion 13A. According to the embodiment, it is thus possible to take in magnetic flux of great magnitude at the end face of the second portion 13B. As a result, according to the embodiment, it is possible to precisely define the position of the end of the bit pattern to be written on the recording medium. This allows an improvement in linear recording density.

In the embodiment, the first layer 13B1 and the second layer 13B2 of the second portion 13B of the shield 13 are exposed at the medium facing surface 30. To be specific, the first layer 13B1 has a front end face located in the medium facing surface 30, and the second layer 13B2 has a first end face located in the medium facing surface 30. If the front end face of the first layer 13B1 or the first end face of the second layer 13B2 protrudes due to the heat generated by the coils 11 and 18 during operation of the magnetic head, it is difficult to reduce the flying height of the slider, and consequently it is difficult to improve the recording density and signal-to-noise ratio.

According to the embodiment, protrusion of the front end face of the first layer 13B1 and the first end face of the second layer 13B2 due to the heat generated by the coils 11 and 18 can be suppressed by the functions of the first stopper layer 61 and the second stopper layer 63. The functions of the first stopper layer 61 and the second stopper layer 63 will now be described in detail.

The first stopper layer 61 and the second stopper layer 63 are each made of a nonmagnetic material having a linear thermal expansion coefficient of $5 \times 10^{-6}/^\circ$ C. or smaller at a temperature of 25° C. to 100° C. Alumina, which is typically used as a material of an insulating layer, has a linear thermal expansion coefficient of approximately $6.5 \times 10^{-6}/^\circ$ C. at a temperature of 25° C. to 100° C. The material of each of the first stopper layer 61 and the second stopper layer 63 is thus sufficiently smaller in linear thermal expansion coefficient than alumina. Consequently, the first stopper layer 61 and the second stopper layer 63 are each capable of suppressing heat-induced expansion more greatly, compared with an insulating layer made of alumina.

As illustrated in FIG. 1 and FIG. 4, the first stopper layer 61 is adjacent to the rear end face of the first layer 13B1. By the configuration in which the first stopper layer 61 made of a nonmagnetic material having a small linear thermal expansion coefficient is disposed adjacent to the rear end face of the first layer 13B1 as described above, it is possible to suppress expansion of the first stopper layer 61 induced by the heat generated by the coils 11 and 18. As a result, displacement of the first layer 13B1 toward such a direction that the front end face protrudes is suppressed, and protrusion of the front end face of the first layer 13B1 is thereby suppressed.

Furthermore, as illustrated in FIG. 4, the first layer 13B1 has the center portion 13B1a including the front end face located in the medium facing surface 30, and the two side portions 13B1b and 13B1c that are located at positions outside the center portion 13B1a along the track width direction and that are not exposed at the medium facing surface. The first stopper layer 61 includes two portions located between the medium facing surface 30 and the two side portions 13B1b and 13B1c, respectively. This suppresses displacement of each of the side portions 13B1b and 13B1c in such a direction as to become closer to the medium facing surface 30 induced by the heat generated by the coils 11 and 18. As a result, displacement of the center portion 13B1a coupled to the side portions 13B1b and 13B1c is also suppressed, and protrusion of the front end face of the first layer 13B1 is thereby suppressed.

The first stopper layer 61 may be provided only at the position adjacent to the rear end face of the first layer 13B1, or only at a position between the medium facing surface 30 and the two side portions 13B1b and 13B1c. In either case, too, it is possible to suppress protrusion of the front end face of the first layer 13B1 for the reasons described above.

As illustrated in FIG. 1 and FIG. 5, the second stopper layer 63 is adjacent to the second end face of the second layer 13B2. By the configuration in which the second stopper layer 63 made of a nonmagnetic material having a small linear thermal expansion coefficient is disposed adjacent to the second end face of the second layer 13B2 as described above, it is possible to suppress expansion of the second stopper layer 63 induced by the heat generated by the coils 11 and 18. As a result, displacement of the second layer 13B2 toward such a direction that the first end face protrudes is suppressed, and protrusion of the first end face of the second layer 13B2 is thereby suppressed.

Furthermore, as illustrated in FIG. 5, the second stopper layer 63 is adjacent to the top surfaces of the side portions 13B1b and 13B1c of the first layer 13B1. Because of this, the second stopper layer 63 also has a function of suppressing displacement of the first layer 13B1 induced by the heat generated by the coils 11 and 18. Consequently, protrusion of the front end face of the first layer 13B1 is suppressed by the second stopper layer 63, too. It should be noted that the second stopper layer 63 alone without the first stopper layer 61 can suppress protrusion of the front end face of the first layer 13B1.

The first stopper layer 61 has the groove 61a that accommodates the first layer 13B1, and the first layer 13B1 is placed in the groove 61a. As a result, it is possible to more effectively suppress displacement of the first layer 13B1 induced by the heat generated by the coils 11 and 18.

Similarly, the second stopper layer 63 has the groove 63a that accommodates the second layer 13B2, and the second layer 13B2 is placed in the groove 63a. As a result, it is possible to more effectively suppress displacement of the second layer 13B2 induced by the heat generated by the coils 11 and 18.

Furthermore, in the embodiment, the third stopper layer 65 made of a nonmagnetic material having a small linear thermal expansion coefficient, like the first stopper layer 61 and the second stopper layer 63, is provided to cover the fourth layer 13B4. The third stopper layer 65 thus suppresses displacement of the fourth layer 13B4 induced by the heat generated by the coils 11 and 18. It is thereby possible to suppress displacement of each of the second layer 13B2 and the first layer 13B1 occurring in response to the displacement of the fourth layer 13B4. Consequently, protrusion of each of the front end face of the first layer 13B1 and the first end face of the second layer 13B2 is suppressed by the third stopper layer 65, too.

As described above, the material used to form the first stopper layer 61, the second stopper layer 63 and the third stopper layer 65 is a nonmagnetic material having a linear thermal expansion coefficient of $5 \times 10^{-6}/°$C. or smaller at a temperature of 25° C. to 100° C. This nonmagnetic material is preferably an inorganic material or a metal material. Examples of inorganic materials having a linear thermal expansion coefficient of $5 \times 10^{-6}/°$C. or smaller at a temperature of 25° C. to 100° C. include SiC, AlN and $Si_3N_4$. SiC has a linear thermal expansion coefficient of approximately $4.0 \times 10^{-6}/°$C. at a temperature of 25° C. to 100° C. AlN has a linear thermal expansion coefficient of approximately $4.5 \times 10^{-6}/°$C. at a temperature of 25° C. to 100° C. $Si_3N_4$ has a linear thermal expansion coefficient of approximately $3.2 \times 10^{-6}/°$C. at a temperature of 25° C. to 100° C. Examples of metal materials having a linear thermal expansion coefficient of $5 \times 10^{-6}/°$C. or smaller at a temperature of 25° C. to 100° C. include W (tungsten). W has a linear thermal expansion coefficient of approximately $4.5 \times 10^{-6}/°$C. at a temperature of 25° C. to 100° C. Any of SiC, AlN, $Si_3N_4$ and W can be employed as the nonmagnetic material to form the stopper layers 61, 62 and 63.

In order to suppress displacement of each of the first stopper layer 61, the second stopper layer 63 and the third stopper layer 65 resulting from expansion of other layers, it is desirable that the nonmagnetic material used to form the first stopper layer 61, the second stopper layer 63 and the third stopper layer 65 have high hardness. SiC has a Vickers hardness higher than that of alumina. In view of this, SiC is particularly preferred as the nonmagnetic material to form the first stopper layer 61, the second stopper layer 63 and the third stopper layer 65.

In the case where a nonmagnetic material having a hardness higher than that of alumina, such as SiC, is used to form the stopper layers 61, 63 and 65, if at least one of the stopper layers 61, 63 and 65 is configured to be exposed at the medium facing surface 30, there is a possibility that the at least one of the stopper layers 61, 63 and 65 may protrude at the medium facing surface 30 formed by polishing. This is because nonmagnetic materials having a hardness higher than that of alumina are more resistant to polishing than alumina when polishing is performed to form the medium facing surface 30. In the embodiment, however, none of the stopper layers 61, 63 and 65 are exposed at the medium facing surface 30. Consequently, according to the embodiment, it is impossible that any of the stopper layers 61, 63 and 65 may protrude even when a nonmagnetic material having a hardness higher than that of alumina, such as SiC, is used to form the stopper layers 61, 63 and 65.

If the nonmagnetic material used to form the first stopper layer 61, the second stopper layer 63 and the third stopper layer 65 has a high thermal conductivity, it is possible to dissipate the heat generated by the coils 11 and 18 through the first stopper layer 61, the second stopper layer 63 and the third stopper layer 65. It is therefore preferred that the nonmagnetic material mentioned above be high in thermal conductivity. It is desirable that the nonmagnetic material used to form the first stopper layer 61, the second stopper layer 63 and the third stopper layer 65 have a thermal conductivity of 40 W/m·K or higher at a temperature of 25° C. Alumina has a thermal conductivity of approximately 30 W/m·K at a temperature of 25° C. Therefore, if the nonmagnetic material mentioned above has a thermal conductivity of 40 W/m·K or higher at a temperature of 25° C., it means that its thermal conductivity is sufficiently higher than that of alumina. SiC has a thermal conductivity of approximately 75 W/m·K at a temperature of 25° C. AlN has a thermal conductivity of approximately 170 W/m·K at a temperature of 25° C. W has a thermal conductivity of approximately 170 W/m·K at a temperature of 25° C. Therefore, SiC, AlN and W, each of which has a linear thermal expansion coefficient of $5 \times 10^{-6}$/° C. or smaller at a temperature of 25° C. to 100° C. and has a thermal conductivity of 40 W/m·K or higher at a temperature of 25° C., are desirable as the nonmagnetic material to form the first stopper layer 61, the second stopper layer 63 and the third stopper layer 65.

In the embodiment, the step of forming the first layer 13B1 includes the steps of forming a magnetic film such that the groove 61a of the first stopper layer 61 is filled with the magnetic film and that the top surface of the magnetic film is located higher than the top surface of the first stopper layer 61, the magnetic film being intended to undergo polishing later to thereby become the first layer 13B1; and polishing the magnetic film so that the top surface of the first stopper layer 61 and the top surface of the magnetic film are flattened and the magnetic film thereby becomes the first layer 13B1. In the step of polishing the magnetic film, the first stopper layer 61 functions as a polishing stopper to stop the polishing. According to the embodiment, it is thus possible to precisely control the dimension of the first layer 13B1 taken in the direction in which layers are stacked, and consequently it is possible to reduce variations in characteristics of the magnetic heads.

Furthermore, in the embodiment, as illustrated in FIG. 2, the end face of the pole layer 12 located in the medium facing surface 30 has a width that decreases with increasing distance from the gap layer 14. This makes it possible to prevent the occurrence of a phenomenon in which, when data is written on a certain track, data on a track adjacent thereto is erased due to a skew.

Furthermore, in the embodiment, the pole layer 12 is disposed in the groove 25a of the encasing layer 25 made of a nonmagnetic material, with the nonmagnetic film 27 and the polishing stopper layer 28 in between. Consequently, the width of the pole layer 12 is smaller than that of the groove 25a. This makes it possible to form the groove 25a easily, and to easily reduce the width of the pole layer 12, or the width of the top surface of the track width defining portion 12A that defines the track width, in particular. Consequently, according to the embodiment, it is possible to provide a track width smaller than the minimum track width that can be formed by photolithography, and to control the track width with accuracy.

Second Embodiment

Figure 19:
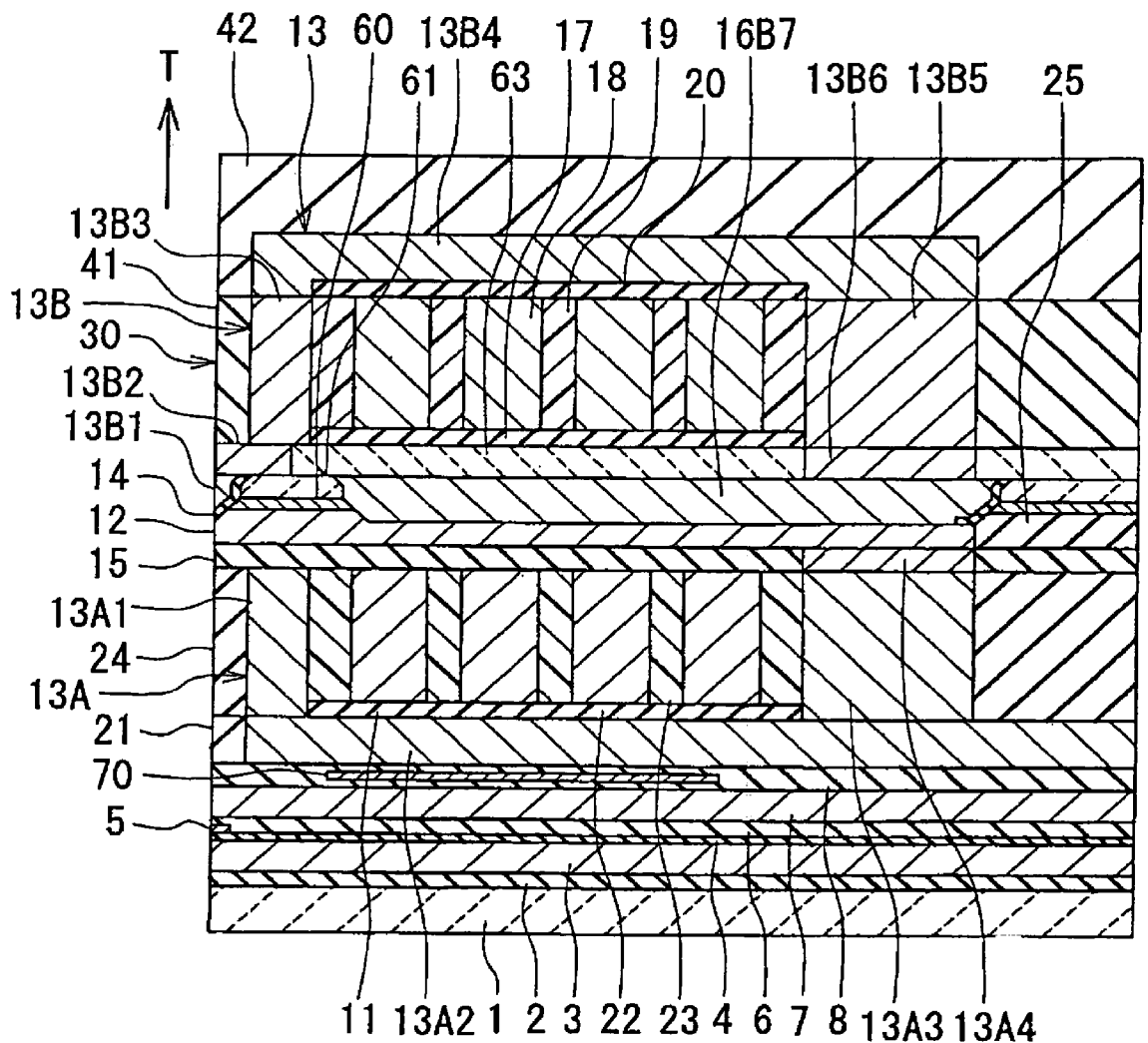
FIG. 19 is a cross-sectional view illustrating the configuration of a magnetic head of a second embodiment of the invention.

A magnetic head of a second embodiment of the invention and a method of manufacturing the same will now be described. Reference is first made to FIG. 19 to describe the configuration of the magnetic head of the second embodiment. FIG. 19 is a cross-sectional view illustrating the configuration of the magnetic head of the second embodiment. FIG. 19 shows a cross section perpendicular to the medium facing surface and the top surface of the substrate. In FIG. 19 the arrow marked with T shows the direction of travel of the recording medium.

The magnetic head of the second embodiment does not have the nonmagnetic layers 56 and 57 of the first embodiment. In the second embodiment, the nonmagnetic layer 60 and the first stopper layer 61 are stacked in this order on the second portion 12T2 of the top surface of the pole layer 12. Furthermore, the magnetic head of the second embodiment does not have the third stopper layer 65 of the first embodiment.

The magnetic head of the second embodiment has a heater 70 embedded in the nonmagnetic layer 8 made of an insulating material. The heater 70 is provided for heating the components of the magnetic head so as to control the distance between the recording medium and each of the end face of the pole layer 12 and the end face of the MR element 5 located in the medium facing surface 30.

Reference is now made to FIG. 20 to FIG. 23 to describe how to form the nonmagnetic layer 60, the first stopper layer 61, the first layer 13B1 and the top yoke layer 13B7 in this embodiment. In FIG. 20 to FIG. 23 "ABS" indicates a position at which the medium facing surface 30 is to be formed.

Figure 20:
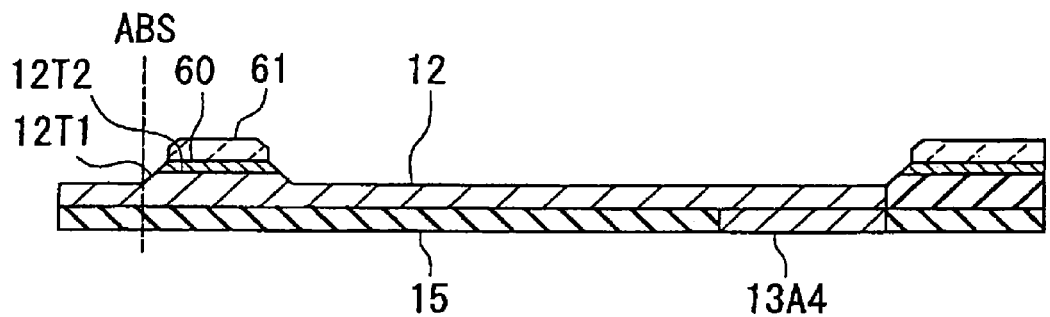
FIG. 20 is a cross-sectional view illustrating a step of a method of manufacturing the magnetic head of the second embodiment of the invention.

FIG. 20 is a cross-sectional view illustrating the step of forming the nonmagnetic layer 60 and the first stopper layer 61. In this step, after the step of FIG. 10, an etching stopper film is formed over the entire top surface of the stack of layers by sputtering, for example, the etching stopper film being intended to undergo partial etching later to thereby become the nonmagnetic layer 60. Next, a nonmagnetic film is formed on the etching stopper film by sputtering, for example, the nonmagnetic film being intended to undergo partial etching later to thereby become the first stopper layer 61. Next, a photoresist layer is formed over the entire top surface of the stack of layers. Next, this photoresist layer is patterned to thereby form a mask to be used for etching the nonmagnetic film to become the first stopper layer 61. Using this mask, the nonmagnetic film is then partially etched by RIE, for example. The etching of the nonmagnetic film is performed such that the bottom of each groove formed by the etching reaches the top surface of the etching stopper film and the etching is stopped at that level. The etched portions of the nonmagnetic film become the grooves of the first stopper layer 61, while the remainder of the nonmagnetic film becomes the first stopper layer 61. The mask is then removed.

Next, the etching stopper film except a portion thereof located below the first stopper layer 61 is removed by IBE, for example, using the first stopper layer 61 as a mask. As a result, the remaining portion of the etching stopper film becomes the nonmagnetic layer 60. Next, the magnetic layer is partially etched by IBE, for example, using the first stopper layer 61 as a mask. As a result, the first portion 12T1 and the second portion 12T2 are formed in the top surface of the magnetic layer, whereby the magnetic layer becomes the pole layer 12.

Figure 21:
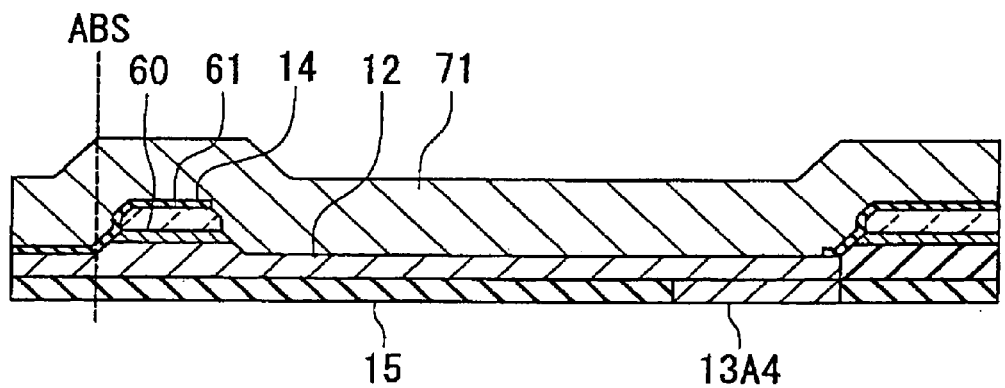
FIG. 21 is a cross-sectional view illustrating a step that follows the step of FIG. 20.

FIG. 21 is a cross-sectional view illustrating a step that follows the step of FIG. 20. In this step, first, the gap layer 14 is formed over the entire top surface of the stack of layers by sputtering, for example. Next, the gap layer 14 is selectively etched to thereby form in the gap layer 14 an opening for exposing a portion of the top surface of the pole layer 12 away from the medium facing surface 30. Next, a magnetic film 71 is formed on the top surface of the stack of layers by frame plating, for example, the magnetic film 71 being intended to become the first layer 13B1 and the top yoke layer 13B7 later. The magnetic film 71 is formed such that the grooves of the first stopper layer 61 are filled with the magnetic film 71 and that the top surface of the magnetic film 71 is located higher than the top surface of the first stopper layer 61. Next, an insulating layer not shown is formed over the entire top surface of the stack of layers by sputtering, for example.

Figure 22:
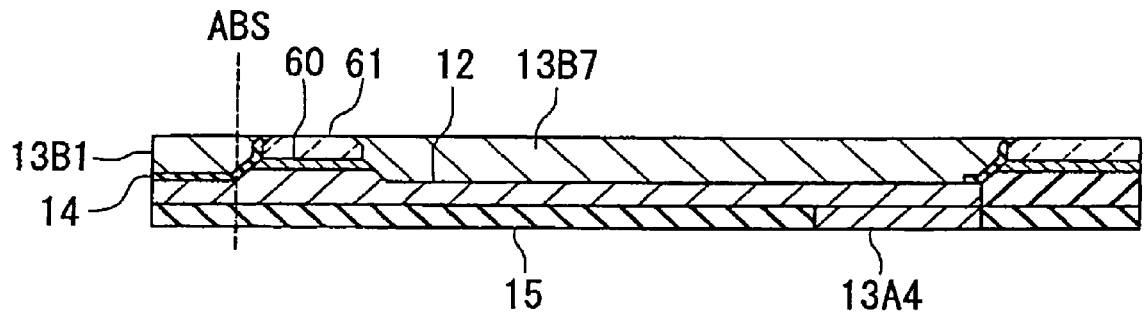
FIG. 22 is a cross-sectional view illustrating a step that follows the step of FIG. 21.

FIG. 22 is a cross-sectional view illustrating a step that follows the step of FIG. 21. In this step, the insulating layer, the magnetic film 71 and the gap layer 14 are polished by CMP, for example, so that the top surface of the first stopper layer 61 is exposed. As a result, the first layer 13B1 and the top yoke layer 13B7 are formed by the nonmagnetic film 71 remaining in the grooves of the first stopper layer 61. Furthermore, as a result of this polishing, the top surfaces of the first layer 13B1, the top yoke layer 13B7, the first stopper layer 61 and the insulating layer are flattened.

Figure 23:
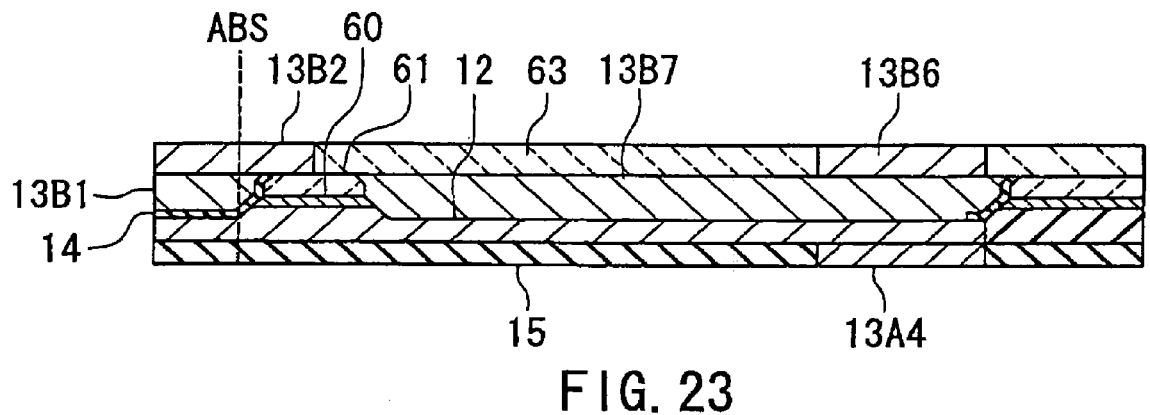
FIG. 23 is a cross-sectional view illustrating a step that follows the step of FIG. 22.

According to the method of manufacturing the magnetic head of the second embodiment, steps that follow are the same as those of the first embodiment. FIG. 23 illustrates a state where the second stopper layer 63, the second layer 13B2 and the sixth layer 13B6 have been formed.

The remainder of configuration, function and effects of the second embodiment are similar to those of the first embodiment.

Third Embodiment

Figure 24:
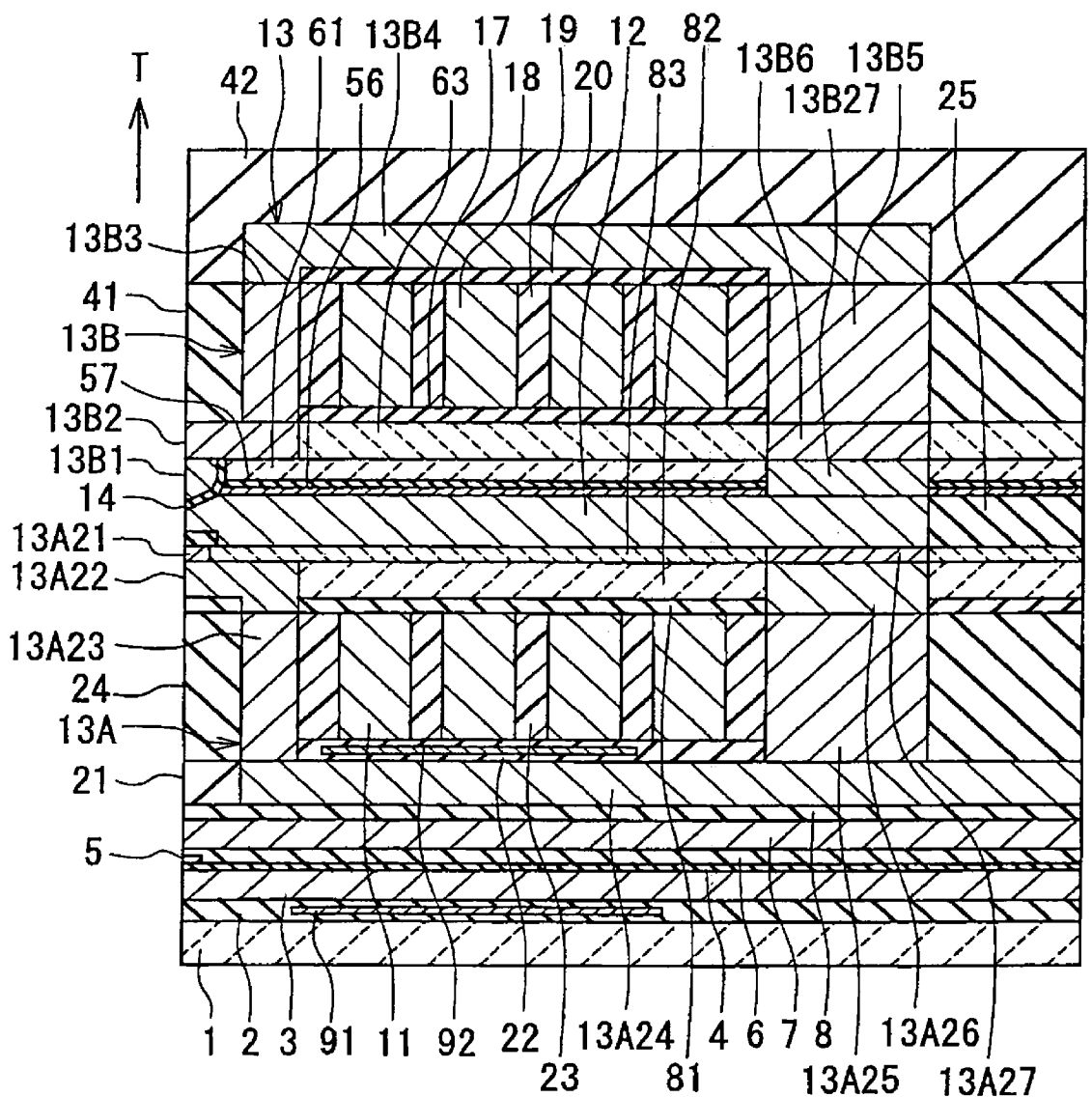
FIG. 24 is a cross-sectional view illustrating the configuration of a magnetic head of a third embodiment of the invention.

A magnetic head of a third embodiment of the invention and a method of manufacturing the same will now be described. Reference is first made to FIG. 24 to describe the configuration of the magnetic head of the third embodiment. FIG. 24 is a cross-sectional view illustrating the configuration of the magnetic head of the third embodiment. FIG. 24 shows a cross section perpendicular to the medium facing surface and the top surface of the substrate. In FIG. 24 the arrow marked with T shows the direction of travel of the recording medium.

The magnetic head of the third embodiment is different from the magnetic head of the first embodiment in the configuration of the first portion 13A of the shield 13. The magnetic head of the third embodiment does not have the coupling portions 13C1, 13C2, 13C3 and the 13C4. Furthermore, in the third embodiment, a seventh layer 13B27 for coupling the sixth layer 13B6 and the pole layer 12 to each other is provided in place of the top yoke layer 13B7 of the first embodiment.

The first portion 13A of the third embodiment includes a first layer 13A21, a second layer 13A22, a third layer 13A23, a fourth layer 13A24, a fifth layer 13A25, a sixth layer 13A26, and a seventh layer 13A27 that are magnetically coupled.

The fourth layer 13A24 is disposed on the nonmagnetic layer 8. The fourth layer 13A24 has an end face closer to the medium facing surface 30, and this end face is located at a distance from the medium facing surface 30. The insulating layer 21 is disposed around the fourth layer 13A24 on the nonmagnetic layer 8. The insulating layer 22 is disposed on a portion of the top surface of the fourth layer 13A24. The first coil 11 is disposed on the insulating layer 22.

The third layer 13A23 and the fifth layer 13A25 are disposed on the fourth layer 13A24. The third layer 13A23 is disposed between the medium facing surface 30 and the coil 11. The third layer 13A23 has an end face closer to the medium facing surface 30, and this end face is located at a distance from the medium facing surface 30. The fifth layer 13A25 is disposed farther from the medium facing surface 30 than is the third layer 13A23. The coil 11 is wound around the fifth layer 13A25.

The insulating layer 23 is disposed around the coil 11 and in the space between the respective adjacent turns of the coil 11. The insulating layer 24 is disposed around the insulating layer 23, the third layer 13A23 and the fifth layer 13A25. The third layer 13A23, the fifth layer 13A25, the coil 11 and the insulating layers 23 and 24 have flattened top surfaces.

The magnetic head of the third embodiment includes an insulating layer 81 disposed on the top surfaces of the coil 11 and the insulating layers 23 and 24. The insulating layer 81 is made of alumina, for example. The insulating layer 81 has an opening for exposing the top surface of the third layer 13A23 and an opening for exposing the top surface of the fifth layer 13A25.

The second layer 13A22 is disposed on the insulating layer 81 and the third layer 13A23. The second layer 13A22 has an end face located in the medium facing surface 30. The sixth layer 13A26 is disposed on the fifth layer 13A25.

The magnetic head of the third embodiment includes a stopper layer 82 disposed around the second layer 13A22 and the sixth layer 13A26 on the insulating layer 81. The stopper layer 82 is a layer for suppressing protrusion of the end face of the second layer 13A22. The stopper layer 82 is made of a nonmagnetic material having a linear thermal expansion coefficient of $5\times10^{-6}/°$ C. or smaller at a temperature of $25°$ C. to $100°$ C., and is disposed adjacent to the second layer 13A22. The specific material used to form the stopper layer 82 is the same as the material used to form the first stopper layer 61 and the second stopper layer 63 of the first embodiment.

The first layer 13A21 is disposed on the second layer 13A22. The first layer 13A21 has an end face located in the medium facing surface 30. The seventh layer 13A27 is disposed on the sixth layer 13A26.

The magnetic head of the third embodiment includes a stopper layer 83 disposed around the first layer 13A21 and the seventh layer 13A27 on the stopper layer 82. The stopper layer 83 is a layer for suppressing protrusion of the end face of the first layer 13A21. The stopper layer 83 is made of a nonmagnetic material having a linear thermal expansion coefficient of $5\times10^{-6}/°$ C. or smaller at a temperature of $25°$ C. to $100°$ C., and is disposed adjacent to the first layer 13A21. The specific material used to form the stopper layer 83 is the same as the material used to form the first stopper layer 61 and the second stopper layer 63 of the first embodiment.

In the third embodiment, the pole layer 12 is placed in the groove of the encasing layer 25. In the embodiment, the groove of the encasing layer 25 does not penetrate the encasing layer 25 in a region near the medium facing surface 30, but penetrates the encasing layer 25 in the other region. Consequently, a stepped portion is formed at the bottom of the groove of the encasing layer 25. The bottom surface of the pole layer 12 also has a stepped portion corresponding to the stepped portion of the bottom of the groove of the encasing layer 25. In the region where the groove of the encasing layer 25 penetrates the encasing layer 25, the bottom surface of the pole layer 12 touches the top surfaces of the seventh layer 13A27 and the stopper layer 83.

In the medium facing surface 30, the end face of the first layer 13A21 is located backward of the end face of the pole layer 12 along the direction T of travel of the recording medium with a predetermined distance provided therebetween. In the third embodiment, the magnetic flux corresponding to the magnetic field generated by the coil 11 passes through the pole layer 12 and the first portion 13A made up of the first layer 13A21 to the seventh layer 13A27. The first portion 13A of the shield 13 of the third embodiment has a function of, at a position backward of the end face of the pole layer 12 along the direction T of travel of the recording medium, taking in a magnetic flux that is generated from the end face of the pole layer 12 and that expands in directions except the direction perpendicular to the plane of the recording medium, and thereby preventing this flux from reaching the recording medium.

The magnetic head of the third embodiment has a heater 91 embedded in the insulating layer 2 and a heater 92 embedded in the insulating layer 22. The heaters 91 and 92 are provided for heating the components of the magnetic head so as to control the distance between the recording medium and each of the end face of the pole layer 12 and the end face of the MR element 5 located in the medium facing surface 30.

The first portion 13A of the shield 13 and elements in the neighborhood thereof in the third embodiment are formed as follows. First, the fourth layer 13A24 is formed on the nonmagnetic layer 8 by frame plating, for example. Next, the insulating layer 21 is formed over the entire top surface of the stack of layers. Next, the insulating layer 21 is polished by CMP, for example, so that the fourth layer 13A24 is exposed.

Next, the insulating layer 22 is formed on regions of the top surfaces of the fourth layer 13A24 and the insulating layer 21 where the coil 11 is to be disposed. Next, the coil 11 is formed on the insulating layer 22 by frame plating, for example. Next, the third layer 13A23 and the fifth layer 13A25 are formed by frame plating, for example. However, the formation of the third layer 13A23 and the fifth layer 13A25 may precede the formation of the coil 11.

Next, the insulating layer 23 made of photoresist, for example, is selectively formed around the coil 11 and in the space between the respective adjacent turns of the coil 11. Next, the insulating layer 24 is formed over the entire top surface of the stack of layers by sputtering, for example. Next, the insulating layer 24 is polished by CMP, for example, so that the third layer 13A23, the fifth layer 13A25 and the coil 11 are exposed, and the top surfaces of the third layer 13A23, the fifth layer 13A25, the coil 11 and the insulating layers 23 and 24 are flattened.

Next, the insulating layer 81 is formed over the entire top surface of the stack of layers by sputtering, for example. Next, the insulating layer 81 is selectively etched to thereby form in the insulating layer 81 the opening for exposing the top surface of the third layer 13A23 and the opening for exposing the top surface of the fifth layer 13A25.

Next, the stopper layer 82 is formed on the insulating layer 81. The method of forming the stopper layer 82 is the same as the method of forming the second stopper layer 63 of the first embodiment. The stopper layer 82 has a groove for placing the second layer 13A22 therein and a groove for placing the sixth layer 13A26 therein. Next, a magnetic film is formed over the entire top surface of the stack of layers by frame plating, for example, the magnetic film being intended to become the second layer 13A22 and the sixth layer 13A26 later. Next, an insulating layer not shown is formed over the entire top surface of the stack of layers by sputtering, for example. Next, the insulating layer and the magnetic film are polished by CMP, for example, so that the stopper layer 82 is exposed. As a result, the second layer 13A22 and the sixth layer 13A26 are formed by the remaining portions of the magnetic film. Furthermore, as a result of this polishing, the top surfaces of the second layer 13A22, the sixth layer 13A26, the stopper layer 82 and the insulating layer are flattened.

Next, the stopper layer 83 is formed on the stopper layer 82 and the second layer 13A22. The method of forming the stopper layer 83 is the same as the method of forming the second stopper layer 63 of the first embodiment. The stopper layer 83 has a groove for placing the first layer 13A21 therein and a groove for placing the seventh layer 13A27 therein. Next, a magnetic film is formed over the entire top surface of the stack of layers by frame plating, for example, the magnetic film being intended to become the first layer 13A21 and the seventh layer 13A27 later. Next, an insulating layer not shown is formed over the entire top surface of the stack of layers by sputtering, for example. Next, the insulating layer and the magnetic film are polished by CMP, for example, so that the stopper layer 83 is exposed. As a result, the first layer 13A21 and the seventh layer 13A27 are formed by the remaining portions of the magnetic film. Furthermore, as a result of this polishing, the top surfaces of the first layer 13A21, the seventh layer 13A27, the stopper layer 83 and the insulating layer are flattened.

In the third embodiment, each of the first layer 13A21 and the second layer 13A22 of the first portion 13A of the shield 13 has an end face located in the medium facing surface 30. According to the third embodiment, the stopper layers 82 and 83 suppress protrusion of the end face of the first layer 13A21 and the end face of the second layer 13A22 induced by the heat generated by the coils 11 and 18.

The remainder of configuration, function and effects of the third embodiment are similar to those of the first embodiment.

Fourth Embodiment

Figure 25:
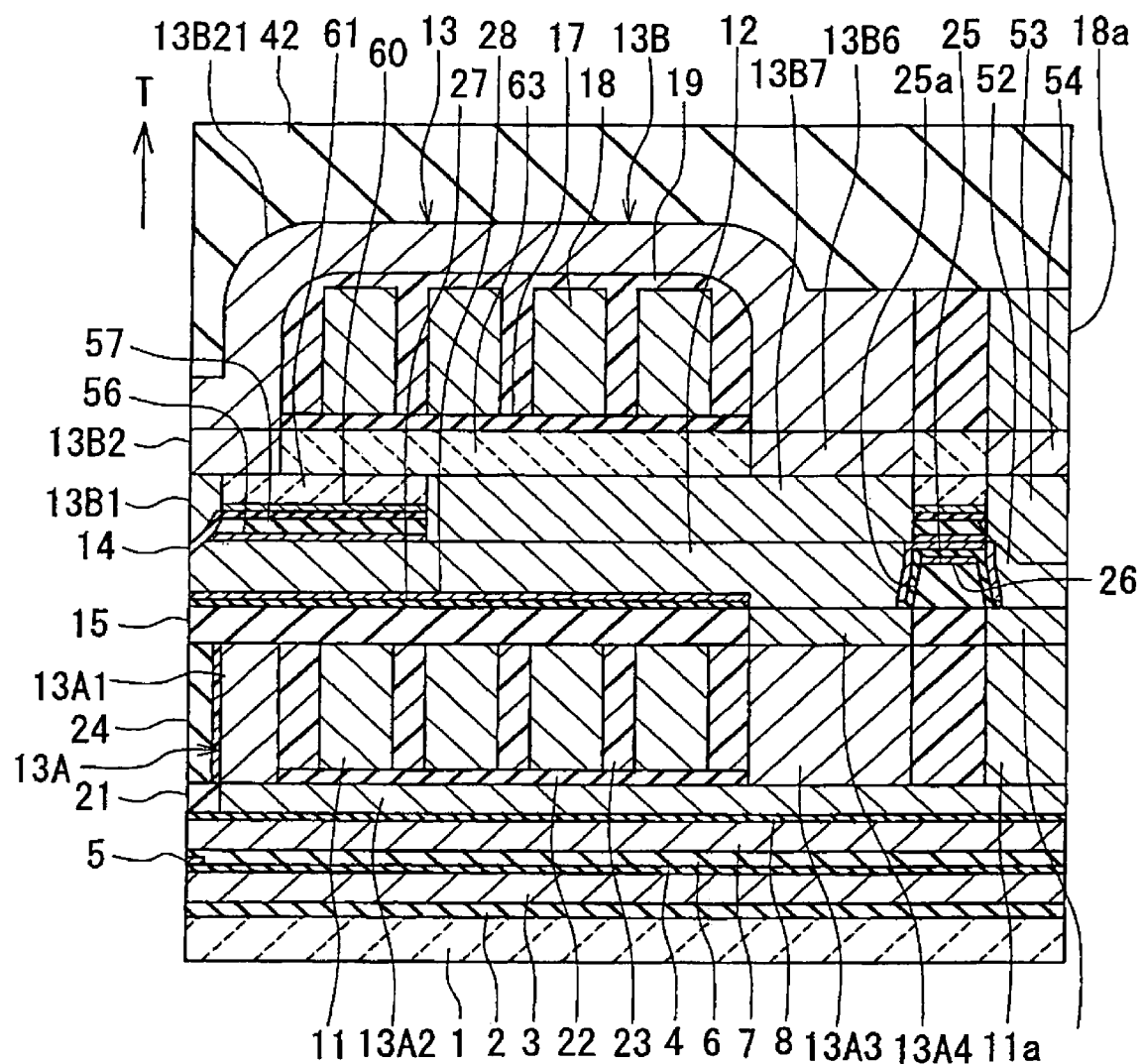
FIG. 25 is a cross-sectional view illustrating the configuration of a magnetic head of a fourth embodiment of the invention.
Figure 26:
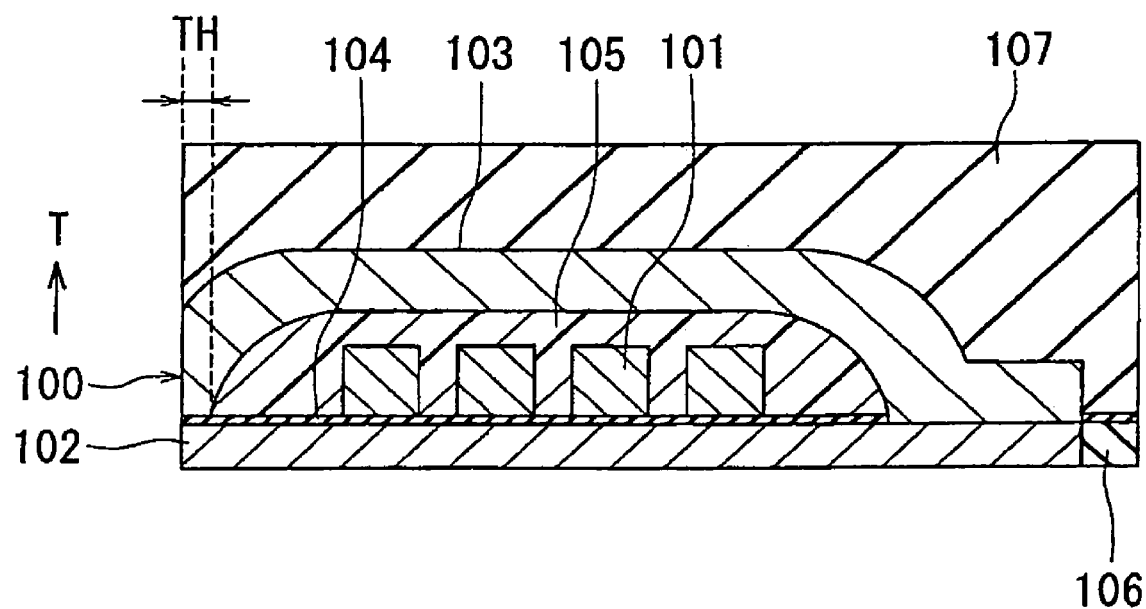
FIG. 26 is a cross-sectional view illustrating a main part of an example of shield-type heads.

A magnetic head of a fourth embodiment of the invention and a method of manufacturing the same will now be described. Reference is first made to FIG. 25 to describe the configuration of the magnetic head of the fourth embodiment. FIG. 25 is a cross-sectional view illustrating the configuration of the magnetic head of the fourth embodiment. FIG. 25 shows a cross section perpendicular to the medium facing surface and the top surface of the substrate. In FIG. 25 the arrow marked with T shows the direction of travel of the recording medium.

The magnetic head of the fourth embodiment is different from the magnetic head of the first embodiment in the configuration of the second portion 13B of the shield 13. In the fourth embodiment, a second layer 13B21 is provided in place of the second layer 13B2, the third layer 13B3, the fourth layer 13B4, the fifth layer 13B5 and the sixth layer 13B6 of the first embodiment. The second layer 13B21 is disposed to couple the first layer 13B1 and the top yoke layer 13B7 to each other. The second layer 13B21 has an end face located in the medium facing surface 30.

The magnetic head of the fourth embodiment does not have the second stopper layer 63 and the insulating layer 64 of the first embodiment. In the fourth embodiment, the insulating layer 17 is disposed on the first stopper layer 61 and the top yoke layer 13B7. The coil 18 and the insulating layer 19 are disposed on the insulating layer 17. Furthermore, the magnetic head of the fourth embodiment does not have the connecting layer 54 of the first embodiment. The connecting portion 18a of the coil 18 is disposed on the connecting layer 53. Furthermore, the magnetic head of the fourth embodiment does not have the insulating layer 20 and the third stopper layer 65 of the first embodiment.

The second portion 13B of the shield 13 and elements in the neighborhood thereof in the fourth embodiment are formed as follows. The first stopper layer 61, the first layer 13A1 and the top yoke layer 13B7 are formed in the same manner as the first embodiment. In the fourth embodiment, next, the insulating layer 17 is formed on the first stopper layer 61 and the top yoke layer 13B7. Next, the coil 18 is formed on the insulating layer 17 by frame plating, for example. Next, the insulating layer 19 is formed to cover the coil 18. Next, the second layer 13B21 is formed by frame plating, for example. The protection layer 42 is formed thereafter.

In the fourth embodiment, the stopper layer 61 suppresses protrusion of the front end face of the first layer 13B1 induced by the heat generated by coils 11 and 18.

In the fourth embodiment, in order to prevent protrusion of the end face of the second layer 13B21, the second layer 13B21 may be configured so that its end face is not exposed at the medium facing surface 30.

The remainder of configuration, function and effects of the fourth embodiment are similar to those of the first embodiment.

The present invention is not limited to the foregoing embodiments but can be carried out in various modifications. For example, materials to be used for the stopper layers of the present invention are not limited to the ones illustrated in the embodiments, but can be any nonmagnetic materials as long as they have a linear thermal expansion coefficient of $5\times10^{-6}$/° C. or smaller at a temperature of 25° C. to 100° C.

The present invention is also applicable to a magnetic head configured so that the shield 13 has the second portion 13B only.

While the foregoing embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system;
    a shield made of a magnetic material; and
    a gap layer made of a nonmagnetic material, wherein:
    the shield includes a shield layer having a front end face located in the medium facing surface at a position forward of the end face of the pole layer along a direction of travel of the recording medium;
    the gap layer is disposed between the pole layer and the shield layer; and
    the end face of the pole layer located in the medium facing surface has a side adjacent to the gap layer, and this side defines a track width,
    the magnetic head further comprising a first stopper layer for suppressing protrusion of the front end face of the shield layer, the first stopper layer being disposed adjacent to the shield layer and made of a nonmagnetic material having a linear thermal expansion coefficient of $5\times10^{-6}$/° C. or smaller at a temperature of 25° C. to 100° C.

2. The magnetic head for perpendicular magnetic recording according to claim 1, wherein the material of which the first stopper layer is made has a thermal conductivity of 40 W/m·K or higher at a temperature of 25° C.

3. The magnetic head for perpendicular magnetic recording according to claim 2, wherein the material of which the first stopper layer is made is any of SiC, AlN, and W.

4. The magnetic head for perpendicular magnetic recording according to claim 1, wherein the first stopper layer is not exposed at the medium facing surface.

5. The magnetic head for perpendicular magnetic recording according to claim 1, wherein the first stopper layer has a groove for placing the shield layer therein, and the shield layer is placed in the groove.

6. The magnetic head for perpendicular magnetic recording according to claim 1, wherein the shield layer further has a rear end face opposite to the front end face, and the first stopper layer is adjacent to the rear end face of the shield layer.

7. The magnetic head for perpendicular magnetic recording according to claim 1, wherein:
    the shield layer has a center portion including the front end face, and two side portions that are located at positions outside the center portion along a track width direction and that are not exposed at the medium facing surface; and
    the first stopper layer includes two portions located between the medium facing surface and the two side portions.

8. The magnetic head for perpendicular magnetic recording according to claim 1, wherein:
    the shield layer has a bottom surface adjacent to the gap layer, and a top surface opposite to the bottom surface; and
    the first stopper layer is adjacent to the top surface of the shield layer.

9. The magnetic head for perpendicular magnetic recording according to claim 1, wherein:
    the shield layer has a bottom surface adjacent to the gap layer, and a top surface opposite to the bottom surface;
    the shield further includes a second shield layer touching the top surface of the shield layer; and
    the second shield layer has a first end face located in the medium facing surface, and a second end face opposite to the first end face,
    the magnetic head further comprising a second stopper layer for suppressing protrusion of the first end face of the second shield layer, the second stopper layer being disposed adjacent to the second end face of the second shield layer and made of a nonmagnetic material having a linear thermal expansion coefficient of $5\times10^{-6}$/° C. or smaller at a temperature of 25° C. to 100° C.

10. The magnetic head for perpendicular magnetic recording according to claim 9, wherein the second stopper layer is adjacent to the top surface of the shield layer.

11. The magnetic head for perpendicular magnetic recording according to claim 1, wherein the pole layer has a top surface adjacent to the gap layer,
    the magnetic head further comprising a yoke layer that touches a portion of the top surface of the pole layer away from the medium facing surface,
    wherein the first stopper layer has a first groove for placing the shield layer therein and a second groove for placing the yoke layer therein, and the shield layer is placed in the first groove while the yoke layer is placed in the second groove.

12. A method of manufacturing a magnetic head for perpendicular magnetic recording, the magnetic head comprising:
    a medium facing surface that faces toward a recording medium;

a coil for generating a magnetic field corresponding to data to be written on the recording medium;

a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system;

a shield made of a magnetic material; and a gap layer made of a nonmagnetic material, wherein:

the shield includes a shield layer having a front end face located in the medium facing surface at a position forward of the end face of the pole layer along a direction of travel of the recording medium;

the gap layer is disposed between the pole layer and the shield layer; and the end face of the pole layer located in the medium facing surface has a side adjacent to the gap layer, and this side defines a track width, the magnetic head further comprising a first stopper layer for suppressing protrusion of the front end face of the shield layer, the first stopper layer being disposed adjacent to the shield layer and made of a nonmagnetic material having a linear thermal expansion coefficient of $5 \times 10^{-6}/°$ C. or smaller at a temperature of 25° C. to 100° C., the method comprising the steps of:

forming the pole layer;

forming the gap layer on the pole layer;

forming the first stopper layer;

forming the shield such that the shield layer is adjacent to the first stopper layer; and forming the coil.

13. The method of manufacturing the magnetic head for perpendicular magnetic recording according to claim 12, wherein the material of which the first stopper layer is made has a thermal conductivity of 40 W/m·K or higher at a temperature of 25° C.

14. The method of manufacturing the magnetic head for perpendicular magnetic recording according to claim 13, wherein the material of which the first stopper layer is made is any of SiC, AlN, and W.

15. The method of manufacturing the magnetic head for perpendicular magnetic recording according to claim 12, wherein the first stopper layer is not exposed at the medium facing surface.

16. The method of manufacturing the magnetic head for perpendicular magnetic recording according to claim 12, wherein the first stopper layer has a groove for placing the shield layer therein, and the shield layer is formed to be placed in the groove.

17. The method of manufacturing the magnetic head for perpendicular magnetic recording according to claim 16, further comprising the step of forming an etching stopper film on the gap layer after the gap layer is formed, wherein the step of forming the first stopper layer includes the steps of: forming a nonmagnetic film on the etching stopper film, the nonmagnetic film being intended to undergo partial etching later to thereby become the first stopper layer; and partially etching the nonmagnetic film until the etching stopper film is exposed so that an etched portion of the nonmagnetic film becomes the groove while the remainder of the nonmagnetic film becomes the first stopper layer.

18. The method of manufacturing the magnetic head for perpendicular magnetic recording according to claim 16, wherein the step of forming the shield includes the steps of:

forming a magnetic film such that the groove is filled with the magnetic film and that a top surface of the magnetic film is located higher than a top surface of the first stopper layer, the magnetic film being intended to undergo polishing later to thereby become the shield layer; and polishing the magnetic film so that the top surface of the first stopper layer and the top surface of the magnetic film are flattened and the magnetic film thereby becomes the shield layer.

19. The method of manufacturing the magnetic head for perpendicular magnetic recording according to claim 12, wherein the shield layer further has a rear end face opposite to the front end face, and the first stopper layer is adjacent to the rear end face of the shield layer.

20. The method of manufacturing the magnetic head for perpendicular magnetic recording according to claim 12, wherein:

the shield layer has a center portion including the front end face, and two side portions that are located at positions outside the center portion along a track width direction and that are not exposed at the medium facing surface; and the first stopper layer includes two portions located between the medium facing surface and the two side portions.

21. The method of manufacturing the magnetic head for perpendicular magnetic recording according to claim 12, wherein:

the shield layer has a bottom surface adjacent to the gap layer, and a top surface opposite to the bottom surface; and the first stopper layer is formed after forming the shield layer, such that the first stopper layer is adjacent to the top surface of the shield layer.

22. The method of manufacturing the magnetic head for perpendicular magnetic recording according to claim 12, wherein:

the shield layer has a bottom surface adjacent to the gap layer, and a top surface opposite to the bottom surface; and the shield further includes a second shield layer touching the top surface of the shield layer; and the second shield layer has a first end face located in the medium facing surface and a second end face opposite to the first end face, the magnetic head further comprising a second stopper layer for suppressing protrusion of the first end face of the second shield layer, the second stopper layer being disposed adjacent to the second end face of the second shield layer and made of a nonmagnetic material having a linear thermal expansion coefficient of $5 \times 10^{-6}/°$ C. or smaller at a temperature of 25° C. to 100° C., the method further comprising the step of forming the second stopper layer and the second shield layer after the first stopper layer and the shield layer are formed.

23. The method of manufacturing the magnetic head for perpendicular magnetic recording according to claim 22, wherein the second stopper layer is adjacent to the top surface of the shield layer.

24. The method of manufacturing the magnetic head for perpendicular magnetic recording according to claim 12, wherein the pole layer has a top surface adjacent to the gap layer, the magnetic head further comprising a yoke layer that touches a portion of the top surface of the pole layer away from the medium facing surface, wherein the first stopper layer has a first groove for placing the shield layer therein and a second groove for placing the yoke layer therein, the method further comprising the step of forming the yoke layer, wherein:

the shield layer is formed to be placed in the first groove; and the yoke layer is formed to be placed in the second groove.

* * * * *